US009645878B2

(12) United States Patent
Walker et al.

(10) Patent No.: US 9,645,878 B2
(45) Date of Patent: May 9, 2017

(54) ERROR HANDLING FOR FILES EXCHANGED OVER A NETWORK

(71) Applicant: QUALCOMM Incorporated, San Diego, CA (US)

(72) Inventors: Gordon Kent Walker, Poway, CA (US); Nagaraju Naik, San Diego, CA (US); Thomas Stockhammer, Bergen (DE)

(73) Assignee: QUALCOMM Incorporated, San Diego, CA (US)

( * ) Notice: Subject to any disclaimer, the term of this patent is extended or adjusted under 35 U.S.C. 154(b) by 64 days.

(21) Appl. No.: 14/793,398

(22) Filed: Jul. 7, 2015

(65) Prior Publication Data
US 2016/0011923 A1 Jan. 14, 2016

Related U.S. Application Data

(60) Provisional application No. 62/022,539, filed on Jul. 9, 2014.

(51) Int. Cl.
G06F 11/00 (2006.01)
G06F 11/07 (2006.01)
(Continued)

(52) U.S. Cl.
CPC ........ G06F 11/079 (2013.01); G06F 11/0751 (2013.01); G06F 11/0787 (2013.01);
(Continued)

(58) Field of Classification Search
CPC ........................... G06F 11/079; G06F 11/0751
(Continued)

(56) References Cited

U.S. PATENT DOCUMENTS

2006/0268841 A1* 11/2006 Nagaraj ................ H04L 1/0083
370/352
2009/0254798 A1* 10/2009 Gisquet ................ H04L 1/0045
714/819
2014/0173677 A1* 6/2014 Lohmar ............... H04N 19/895
725/116

FOREIGN PATENT DOCUMENTS

CN 102929733 A 2/2013
EP 0851685 A2 7/1998

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, (Joint Collaborative Team on Video Coding of ISO/IEC JTC1/SC29/WG11 and ITU-T SG. 16); Jan. 6, 2011, 137 pp.

(Continued)

Primary Examiner — Dieu-Minh Le
(74) Attorney, Agent, or Firm — Shumaker & Sieffert, P.A.

(57) ABSTRACT

An example device for processing media data includes one or more processors configured to receive a file including media data, determine that a portion of the file is potentially erroneous, form error-indicative data indicating that the file includes the portion that is potentially erroneous, and store the file and the error-indicative data to a location available to a target application for the media data of the file. Another example device includes one or more processors configured to receive a file including media data, receive a first set of information indicative of one or more removable portions of the file that can be removed from the file, receive a second set of information indicative of a suspect portion of the file, determine one or more of the removable portions that completely overlap the suspect portion, and remove the determined one or more removable portions from the file.

29 Claims, 9 Drawing Sheets

(51) Int. Cl.
*H04L 29/06* (2006.01)
*H04N 21/4425* (2011.01)
*H04N 21/4545* (2011.01)
*H04N 21/482* (2011.01)
*H04N 21/6437* (2011.01)
*H04N 21/845* (2011.01)
*H04N 21/438* (2011.01)
*H04N 19/895* (2014.01)

(52) U.S. Cl.
CPC .......... *H04L 65/604* (2013.01); *H04L 65/608* (2013.01); *H04L 65/80* (2013.01); *H04N 21/4425* (2013.01); *H04N 21/45457* (2013.01); *H04N 21/4825* (2013.01); *H04N 21/6437* (2013.01); *H04N 21/8456* (2013.01); *H04N 19/895* (2014.11); *H04N 21/4383* (2013.01)

(58) Field of Classification Search
USPC ........................ 714/37, 36, 38.1, 48, 46, 49; 717/124–126
See application file for complete search history.

(56) References Cited

OTHER PUBLICATIONS

Wiegand et al., "WD2: Working Draft 2 of High-Efficiency Video Coding," JCTVC-D503, 4th Meeting: Daegu, KR, Jan. 20-28, 2011, (Joint Collaborative Team on Video Coding of ISO/IEC JTC1/SC29/WG11 and ITU-T SG. 16); Apr. 15, 2011, 153 pp.

Wiegand et al., "WD3: Working Draft 3 of High-Efficiency Video Coding," Document JCTVC-E603, 5th Meeting: Geneva, CH, Mar. 16-23, 2011,(Joint Collaborative Team on Video Coding of ISO/IEC JTC1/SC29/WG11 and ITU-T SG. 16); May 9, 2015, 193 pp.

Bross et al., "WD4: Working Draft 4 of High-Efficiency Video Coding," 6th Meeting: Torino, IT, Jul. 14 through 22, 2011, (Joint Collaborative Team on Video Coding of ISO/IEC JTC1/SC29/WG11 and ITU-T SG. 16); JCTVC-F803_d2, Oct. 4, 2011, 226 pp.

Bross et al., "WD5: Working Draft 5 of High-Efficiency Video Coding," 7th Meeting: Geneva, Switzerland, Nov. 21 through 30, 2011, (Joint Collaborative Team on Video Coding of ISO/IEC JTC1/SC29/WG11 and ITU-T SG. 16);JCTVC-G1103_d2, Dec. 30, 2011, 214 pp.

Bross et al., "High efficiency video coding (HEVC) text specification draft 6," 8th Meeting: San Jose, CA, USA, Feb. 1 through 10, 2012, (Joint Collaborative Team on Video Coding of ISO/IEC JTC1/SC29/WG11 and ITU-T SG. 16); JCTVC-H1003, Apr. 2, 2012, 259 pp.

Bross et al., "High efficiency video coding (HEVC) text specification draft 7," 9th Meeting: Geneva, CH, Apr. 27 through May 7, 2012, (Joint Collaborative Team on Video Coding of ISO/IEC JTC1/SC29/WG11 and ITU-T SG. 16); JCTVC-I1003_d2, Jun. 1, 2012, 290 pp.

Bross et al., "High efficiency video coding (HEVC) text specification draft 8," 10th Meeting: Stockholm, SE, Jul. 11 through 20, 2012, (Joint Collaborative Team on Video Coding of ISO/IEC JTC1/SC29/WG11 and ITU-T SG. 16); JCTVC-J1003_d7, Jul. 28, 2012, 261 pp.

Bross et al., "High efficiency video coding (HEVC) text specification draft 9," 11th Meeting: Shanghai, CN, Oct. 10 through 19, 2012, (Joint Collaborative Team on Video Coding of ISO/IEC JTC1/SC29/WG11 and ITU-T SG. 16); JCTVC-K1003_v7, Nov. 2, 2012, 290 pp.

Bross et al., "High efficiency video coding (HEVC) text specification draft 10 (for FDIS & Last Call)," 12th Meeting: Geneva, CH, Jan. 14 through 23, 2013, (Joint Collaborative Team on Video Coding of ISO/IEC JTC1/SC29/WG11 and ITU-T SG. 16); JCTVC-L1003_v34, Mar. 19, 2013, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Fielding, et al., "Hypertext Transfer Protocol—HTTP/1.1," Network Working Group, RFC 2616, Jun. 1999, 160 pp.

ISO/IEC 23009-1: "Information technology—Dynamic adaptive streaming over HTTP (DASH)—Part 1: Media presentation description and segment formats," Technologies de l' information—Diffusion en flux adaptatif dynamique sur HTTP (DASH)—Part 1: Description of the presentation and delivery of media formats, ISO/IEC 23009-1 International Standard, First Edition, Apr. 2012, 132 pp.

"International Standard ISO/IEC 14496-12 Information technology Coding of audio-visual objects Part 12: ISO basemedia file format", Internet Citation, Second Edition; Oct. 2005; XP007914375, 94 pp.

Paila et al., "FLUTE—File Delivery overUnidirectional Transport," Internet Engineering Task Force (IETF), RFC 6726, Nov. 2012.

International Search Report and Written Opinion from International Application No. PCT/US2015/039577, dated Sep. 4, 2015, 13 pp.

Second Written Opinion of International Application No. PPCT/US2015/039577, mailed Jun. 22, 2016, 6 pp.

Response to Second Written Opinion mailed Jun. 22, 2016, from International Application No. PCT/US2015/039577, dated Aug. 22, 2016, 6 pp.

International Preliminary Report on Patentability from International Application No. PCT/US2015/039577, mailed Oct. 28, 2016, 32 pp.

'3rd Generation Partnership Project; Technical Specification Group Services and System Aspects; Multimedia Broadcast Multicast Service (MBMS); Protocols and codecs (Release 6)', 3GPP Standard; 3GPP TS 26.346, 3rd Generation Partnership Project; (3GPP), Mobile Competence; 650, Route des Lucioles; F-06921 Sophia-Antipolis Cedex; France, No. V6.4.0, Mar. 1, 2006, 120 pp.

* cited by examiner

ERROR HANDLING FOR FILES EXCHANGED OVER A NETWORK

This application claims the benefit of U.S. Provisional Application No. 62/022,539, filed Jul. 9, 2014, the entire contents of which are hereby incorporated by reference.

TECHNICAL FIELD

This disclosure relates to storage and transport of coded media data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), H.265/High Efficiency Video Coding and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into blocks. Each block can be further partitioned. Blocks in an intra-coded (I) frame or slice are encoded using spatial prediction with respect to neighboring blocks. Blocks in an inter-coded (P or B) frame or slice may use spatial prediction with respect to neighboring blocks in the same frame or slice or temporal prediction with respect to other reference frames.

After video data has been encoded, the video data may be packetized for transmission or storage. The video data may be assembled into a video file conforming to any of a variety of standards, such as the International Organization for Standardization (ISO) base media file format as defined in ISO/IEC 14496-12:2012(E), and extensions thereof also known as ISO BMFF.

SUMMARY

In general, this disclosure describes techniques related to handling potential errors in files or other data delivered via a network, e.g., media files delivered via a broadcast protocol (via a broadcast network) or via Real-time Transport Protocol (RTP). In particular, a file delivery protocol unit may determine that a portion of a file is suspected of including errors, e.g., errors introduced during network transmission of the file. The file delivery protocol unit may provide data to an application indicative of the portion of the file that is suspected of including errors. For example, the file delivery protocol unit may insert markers into the file itself to demarcate the location of the suspect portion or the file delivery protocol unit may signal a byte range corresponding to the suspect portion. Conversely, the interface could describe ranges/regions of the file that are known to be error free.

Furthermore, the file may include or be accompanied by data that signals portions of the file that can be dropped (that is, removed) without impacting other portions of the file. For instance, for video data, a portion of a file that can be dropped without impacting other portions of the file may be a portion including a frame and zero or more frames that can use the reference frame for reference during decoding. More particularly, there may be one or more droppable portions, including single frames that are not used for reference and groups of frames that use a particular reference frame for reference as well as the reference frame itself. Thus, a media application may determine one or more of the groups of frames (droppable portions) that cover a suspect portion of the file and drop those groups of frames, so as to avoid causing a video decoder to attempt to decode erroneous data. In this manner, this disclosure describes certain aspects of interface design and file structure relative to robust and layer transparent handling of file(s) that contain suspect data or known valid data.

In one example, a method of receiving media data includes receiving a file including media data, determining that a portion of the file is potentially erroneous, forming data indicating that the file includes the portion that is potentially erroneous, and storing the file and the data to a location available to a target application for the media data of the file.

In another example, a method of signaling information for media data includes obtaining a file including media data, determining at least one portion of the media data that can be removed from the file without preventing correct decoding of other portions of the media data, and signaling information that identifies the determined portion.

In another example, a method of processing media data includes receiving a file including media data, receiving a first set of information indicative of one or more removable portions of the file that can be removed from the file without preventing correct decoding of other portions of the media data, receiving a second set of information indicative of a suspect portion of the file that is potentially erroneous, determining one or more of the removable portions that completely overlap the suspect portion, and removing the determined one or more removable portions from the file.

In another example, a method of processing media data includes receiving a first file including media data, receiving a first set of information indicative of one or more playable portions of the first file that can be played when another corresponding portion of the first file is not present in the file, receiving a second set of information indicative of a suspect portion of the first file that is potentially erroneous, determining one or more of the playable portions of the first file that do not overlap the suspect portion and that can be played when the suspect portion is not present in the first file, and outputting a second file that includes the determined playable portions and that does not include the suspect portion.

In another example, a device for processing media data includes one or more processors configured to receive a file including media data, determine that a portion of the file is potentially erroneous, form error-indicative data indicating that the file includes the portion that is potentially erroneous, and store the file and the error-indicative data to a location available to a target application for the media data of the file.

In another example, a device for processing media data includes one or more processors configured to receive a file including media data, receive a first set of information indicative of one or more removable portions of the file that can be removed from the file without preventing correct decoding of other portions of the media data, receive a second set of information indicative of a suspect portion of the file that is potentially erroneous, determine one or more of the removable portions that completely overlap the suspect portion, and remove the determined one or more removable portions from the file.

In another example, a device for receiving media data includes means for receiving a file including media data, means for determining that a portion of the file is potentially erroneous, means for forming data indicating that the file includes the portion that is potentially erroneous, and means for forwarding the file and the data to a media application.

In another example, a device for signaling information for media data includes means for obtaining a file including media data, means for determining at least one portion of the media data that can be removed from the file without preventing correct decoding of other portions of the media data, and means for signaling information that identifies the determined portion.

In another example, a device for processing media data includes means for receiving a file including media data, means for receiving a first set of information indicative of one or more removable portions of the file that can be removed from the file without preventing correct decoding of other portions of the media data, means for receiving a second set of information indicative of a suspect portion of the file that is potentially erroneous, means for determining one or more of the removable portions that completely overlap the suspect portion, and means for removing the determined one or more removable portions from the file.

In another example, a device for processing media data includes means for receiving a first file including media data, means for receiving a first set of information indicative of one or more playable portions of the first file that can be played when another corresponding portion of the first file is not present in the file, means for receiving a second set of information indicative of a suspect portion of the first file that is potentially erroneous, means for determining one or more of the playable portions of the first file that do not overlap the suspect portion and that can be played when the suspect portion is not present in the first file, and means for outputting a second file that includes the determined playable portions and that does not include the suspect portion.

In another example, a method of processing media data comprises obtaining delivery of a plurality of chunks of a file according to a file delivery protocol, and storing the chunks to a location that is accessible to a target application for the file.

In another example, a device for processing media data includes means for obtaining delivery of a plurality of chunks of a file according to a file delivery protocol, and means for storing the chunks to a location that is accessible to a target application for the file.

The details of one or more examples are set forth in the accompanying drawings and the description below. Other features, objects, and advantages will be apparent from the description and drawings, and from the claims.

DETAILED DESCRIPTION

Figure 1:
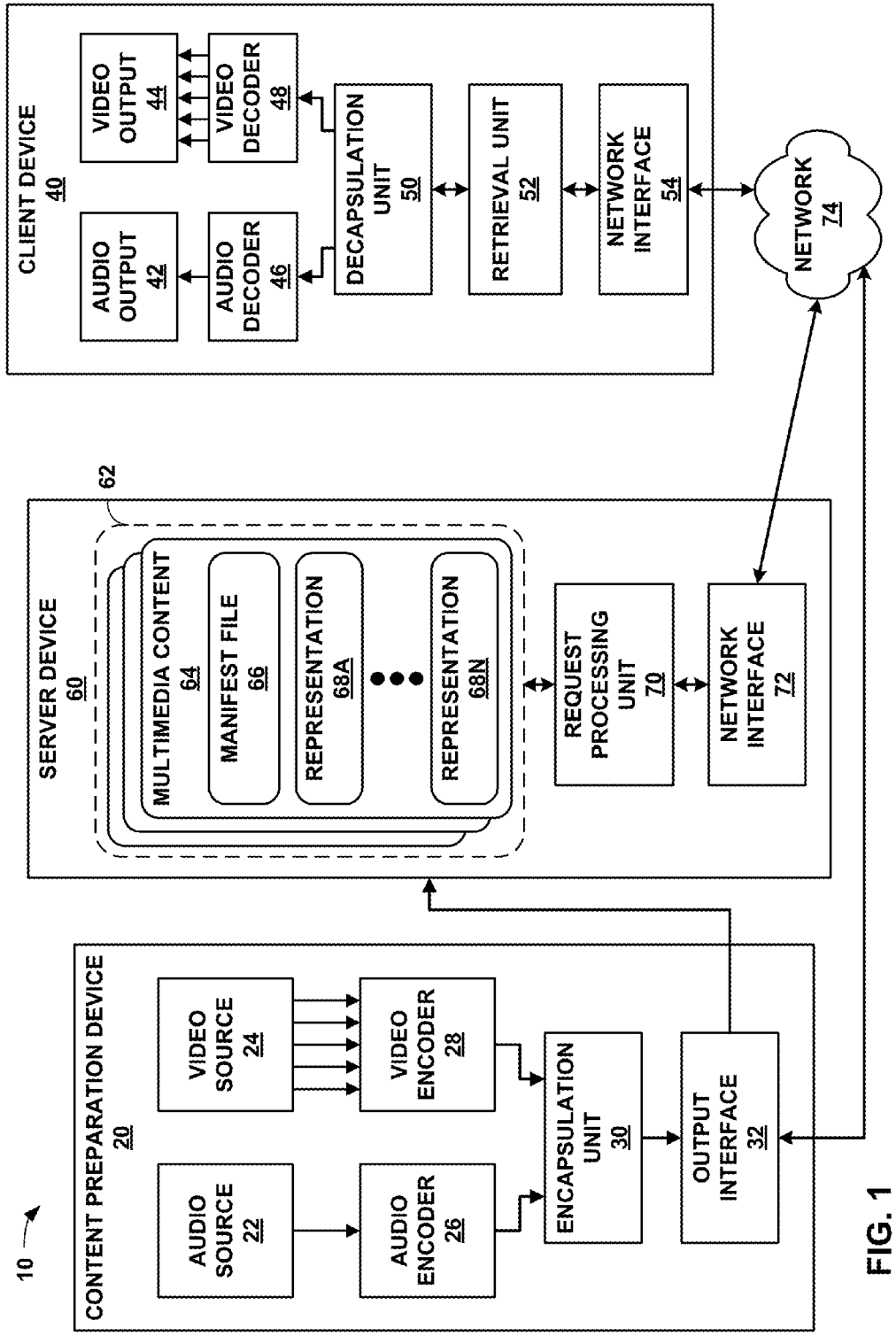
FIG. 1 is a block diagram illustrating an example system that implements techniques for streaming media data over a network.

In general, this disclosure describes techniques related to handling potential errors in files received via a network, e.g., media files received via a broadcast protocol. In particular, a file delivery protocol unit may determine that a portion of a file is suspected of including errors or actually includes errors. The file delivery protocol unit may provide data to an application (e.g., a media player application, such as a DASH client) indicative of the portion of the file that is suspected of including errors. For example, the file delivery protocol unit may insert markers into the file itself to demarcate the location of the suspect portion or the file delivery protocol unit may signal a byte range(s) corresponding to the suspect portion(s), e.g., in a segment index (sidx) box. As another example, the file delivery protocol unit may signal data indicating a potentially erroneous portion of a file (e.g., a byte range). As used herein, "potentially erroneous" portions include portions that have the potential to be erroneous; portions that are, in fact, erroneous; or both.

Furthermore, the file may include or be accompanied by data that signals portions of the file that can be dropped (that is, removed) without impacting the successful utilization of other portions of the file. For instance, for video data, a portion of a file that can be dropped without impacting other portions of the file may be a portion including a reference frame and zero or more frames that can use the reference frame for reference during decoding. More particularly, there may be one or more droppable portions, including single frames that are not used for reference and groups of frames that use a particular reference frame for reference as well as the reference frame itself. Thus, a media application (or other target application) may determine one or more of the groups of for example video frames (droppable portions) that cover a suspect portion of the file and drop those groups of frames, so as to avoid causing a video decoder to attempt to decode erroneous data.

The techniques of this disclosure may be applied to video files conforming to video data encapsulated according to any of a variety of file types, such as ISO base media file format, Scalable Video Coding (SVC) file format, Advanced Video Coding (AVC) file format, Third Generation Partnership Project (3GPP) file format, and/or Multiview Video Coding (MVC) file format, or other similar file formats.

In HTTP streaming, frequently used operations include HEAD, GET, and partial GET. The HEAD operation retrieves a header of a file associated with a given uniform resource locator (URL) or uniform resource name (URN), without retrieving a payload associated with the URL or URN. The GET operation retrieves a whole file associated with a given URL or URN. The partial GET operation receives a byte range as an input parameter and retrieves a continuous number of bytes of a file, where the number of bytes correspond to the received byte range. Thus, movie fragments may be provided for HTTP streaming, because a partial GET operation can get one or more individual movie fragments. In a movie fragment, there can be several track fragments of different tracks. In HTTP streaming, a media presentation may be a structured collection of data that is accessible to the client. The client may request and download media data information to present a streaming service to a user.

In the example of streaming 3GPP data using HTTP streaming, there may be multiple representations for video and/or audio data of multimedia content. As explained below, different representations may correspond to different coding characteristics (e.g., different profiles or levels of a video coding standard), different coding standards or extensions of coding standards (such as multiview and/or scalable extensions), or different bitrates. The manifest of such representations may be defined in a Media Presentation Description (MPD) data structure. A media presentation may correspond to a structured collection of data that is accessible to an HTTP streaming client device. The HTTP streaming client device may request and download media data information to present a streaming service to a user of the client device. A media presentation may be described in the MPD data structure, which may include updates of the MPD.

A media presentation may contain a sequence of one or more periods. Periods may be defined by a Period element in the MPD. Each period may have an attribute start in the MPD. The MPD may include a start attribute and an availableStartTime attribute for each period. For live services, the sum of the start attribute of the period and the MPD attribute availableStartTime may specify the availability time of the period in UTC format, in particular the first Media Segment of each representation in the corresponding period. For on-demand services, the start attribute of the first period may be 0. For any other period, the start attribute may specify a time offset between the start time of the corresponding Period relative to the start time of the first Period. Each period may extend until the start of the next Period, or until the end of the media presentation in the case of the last period. Period start times may be precise. They may reflect the actual timing resulting from playing the media of all prior periods.

Each period may contain one or more Representations for the same media content. A Representation may be one of a number of alternative encoded versions of audio or video data. The Representations may differ by encoding types, e.g., by bitrate, resolution, and/or codec for video data and bitrate, language, and/or codec for audio data. The term Representation may be used to refer to a section of encoded audio or video data corresponding to a particular Period of the multimedia content and encoded in a particular way.

Representations of a particular period may be assigned to a group indicated by an attribute in the MPD indicative of an adaptation set to which the representations belong. Representations in the same adaptation set are generally considered alternatives to each other, in that a client device can dynamically and seamlessly switch between these representations, e.g., to perform bandwidth adaptation. For example, each representation of video data for a particular period may be assigned to the same adaptation set, such that any of the representations may be selected for decoding to present media data, such as video data or audio data, of the multimedia content for the corresponding period. The media content within one period may be represented by either one representation from group 0, if present, or the combination of at most one representation from each non-zero group, in some examples. Timing data for each representation of a period may be expressed relative to the start time of the period.

A Representation may include one or more Segments. Each Representation may include an Initialization Segment, or each Segment of a Representation may be self-initializing. When present, the Initialization Segment may contain initialization information for accessing the Representation. In general, the Initialization Segment does not contain media data. A Segment may be uniquely referenced by an identifier, such as a uniform resource locator (URL), uniform resource name (URN), or uniform resource identifier (URI). The MPD may provide the identifiers for each Segment. In some examples, the MPD may also provide byte ranges in the form of a range attribute, which may correspond to the data for a segment within a file accessible by the URL, URN, or URI.

FIG. 1 is a block diagram illustrating an example system 10 that implements techniques for streaming media data over a network. In this example, system 10 includes content preparation device 20, server device 60, and client device 40. Client device 40 and server device 60 are communicatively coupled by network 74, which may comprise the Internet. In some examples, content preparation device 20 and server device 60 may also be coupled by network 74 or another network, or may be directly communicatively coupled. In some examples, content preparation device 20 and server device 60 may comprise the same device.

Content preparation device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to server device 60 in all examples, but may store multimedia content to a separate medium that is read by server device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured (or generated) by audio source 22 contemporaneously with video data captured (or generated) by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for encoded video frame was recorded. In such examples, an audio frame corresponding to a video frame may comprise an audio frame comprising a timestamp and a video frame comprising the same timestamp. Content preparation device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a representation. For example, the coded video or audio part of the representation can be an elementary stream. An elementary stream may be converted into a packetized elementary stream (PES) before being encapsulated within a video file. Within the same representation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

In the example of FIG. 1, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise one of audio data, video data, text data (e.g., for closed captions), or other such data. The representation may include an elementary stream, such as an audio elementary stream or a video elementary stream. Each PES packet may include a stream_id that identifies the elementary stream to which the PES packet belongs. Encapsulation unit 30 is responsible for assembling elementary streams into video files (e.g., segments) of various representations.

Encapsulation unit 30 receives PES packets for elementary streams of a representation from audio encoder 26 and video encoder 28 and forms corresponding network abstraction layer (NAL) units from the PES packets. In the example of H.264/AVC (Advanced Video Coding), coded video segments are organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture, hence coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points. In addition, encapsulation unit 30 may form a manifest file, such as a media presentation descriptor (MPD) that describes characteristics of the representations. Encapsulation unit 30 may format the MPD according to extensible markup language (XML).

Encapsulation unit 30 may provide data for one or more representations of multimedia content, along with the manifest file (e.g., the MPD) to output interface 32. Output interface 32 may comprise a network interface or an interface for writing to a storage medium, such as a universal serial bus (USB) interface, a CD or DVD writer or burner, an interface to magnetic or flash storage media, or other interfaces for storing or transmitting media data. Encapsulation unit 30 may provide data of each of the representations of multimedia content to output interface 32, which may send the data to server device 60 via network transmission or storage media. In the example of FIG. 1, server device 60 includes storage medium 62 that stores various multimedia contents 64, each including a respective manifest file 66 and one or more representations 68A-68N (representations 68). In some examples, output interface 32 may also send data directly to network 74.

In some examples, representations 68 may be separated into adaptation sets. That is, various subsets of representations 68 may include respective common sets of characteristics, such as codec, profile and level, resolution, number of views, file format for segments, text type information that may identify a language or other characteristics of text to be displayed with the representation and/or audio data to be decoded and presented, e.g., by speakers, camera angle information that may describe a camera angle or real-world camera perspective of a scene for representations in the adaptation set, rating information that describes content suitability for particular audiences, or the like.

Manifest file 66 may include data indicative of the subsets of representations 68 corresponding to particular adaptation sets, as well as common characteristics for the adaptation sets. Manifest file 66 may also include data representative of individual characteristics, such as bitrates, for individual representations of adaptation sets. In this manner, an adaptation set may provide for simplified network bandwidth adaptation. Representations in an adaptation set may be indicated using child elements of an adaptation set element of manifest file 66.

Server device 60 includes request processing unit 70 and network interface 72. In some examples, server device 60 may include a plurality of network interfaces. Furthermore, any or all of the features of server device 60 may be implemented on other devices of a content delivery network, such as routers, bridges, proxy devices, switches, or other devices. In some examples, intermediate devices of a content delivery network may cache data of multimedia content 64, and include components that conform substantially to those of server device 60. In general, network interface 72 is configured to send and receive data via network 74.

Request processing unit 70 is configured to receive network requests from client devices, such as client device 40, for data of storage medium 62. For example, request processing unit 70 may implement hypertext transfer protocol (HTTP) version 1.1, as described in RFC 2616, "Hypertext Transfer Protocol—HTTP/1.1," by R. Fielding et al, Network Working Group, IETF, June 1999. That is, request processing unit 70 may be configured to receive HTTP GET or partial GET requests and provide data of multimedia content 64 in response to the requests. The requests may specify a segment of one of representations 68, e.g., using a URL of the segment. In some examples, the requests may also specify one or more byte ranges of the segment, thus comprising partial GET requests. Request processing unit 70 may further be configured to service HTTP HEAD requests to provide header data of a segment of one of representations 68. In any case, request processing unit 70 may be configured to process the requests to provide requested data to a requesting device, such as client device 40.

Additionally or alternatively, request processing unit 70 may be configured to deliver media data via a broadcast or multicast protocol, such as eMBMS. Content preparation device 20 may create DASH segments and/or sub-segments in substantially the same way as described, but server device 60 may deliver these segments or sub-segments using eMBMS or another broadcast or multicast network transport protocol. For example, request processing unit 70 may be configured to receive a multicast group join request from client device 40. That is, server device 60 may advertise an Internet protocol (IP) address associated with a multicast group to client devices, including client device 40, associated with particular media content (e.g., a broadcast of a live event). Client device 40, in turn, may submit a request to join the multicast group. This request may be propagated throughout network 74, e.g., routers making up network 74, such that the routers are caused to direct traffic destined for the IP address associated with the multicast group to subscribing client devices, such as client device 40.

As illustrated in the example of FIG. 1, multimedia content 64 includes manifest file 66, which may correspond to a media presentation description (MPD). Manifest file 66 may contain descriptions of different alternative representations 68 (e.g., video services with different qualities) and the description may include, e.g., codec information, a profile value, a level value, a bit rate, and other descriptive characteristics of representations 68. Client device 40 may retrieve the MPD of a media presentation to determine how to access segments of representations 68.

In particular, retrieval unit 52 may retrieve configuration data (not shown) of client device 40 to determine decoding capabilities of video decoder 48 and rendering capabilities of video output 44. The configuration data may also include any or all of a language preference selected by a user of client device 40, one or more camera perspectives corresponding to depth preferences set by the user of client device 40, and/or a rating preference selected by the user of client device 40. Retrieval unit 52 may comprise, for example, a web browser or a media client configured to submit HTTP GET and partial GET requests. Retrieval unit 52 may correspond to software instructions executed by one or more processors or processing units (not shown) of client device 40. In some examples, all or portions of the functionality described with respect to retrieval unit 52 may be implemented in hardware, or a combination of hardware, software, and/or firmware, where requisite hardware may be provided to execute instructions for software or firmware.

Retrieval unit 52 may compare the decoding and rendering capabilities of client device 40 to characteristics of representations 68 indicated by information of manifest file 66. Retrieval unit 52 may initially retrieve at least a portion of manifest file 66 to determine characteristics of representations 68. For example, retrieval unit 52 may request a portion of manifest file 66 that describes characteristics of one or more adaptation sets. Retrieval unit 52 may select a subset of representations 68 (e.g., an adaptation set) having characteristics that can be satisfied by the coding and rendering capabilities of client device 40. Retrieval unit 52 may then determine bitrates for representations in the adaptation set, determine a currently available amount of network bandwidth, and retrieve segments from one of the representations having a bitrate that can be satisfied by the network bandwidth.

In general, higher bitrate representations may yield higher quality video playback, while lower bitrate representations may provide sufficient quality video playback when available network bandwidth decreases. Accordingly, when available network bandwidth is relatively high, retrieval unit 52 may retrieve data from relatively high bitrate representations, whereas when available network bandwidth is low, retrieval unit 52 may retrieve data from relatively low bitrate representations. In this manner, client device 40 may stream multimedia data over network 74 while also adapting to changing network bandwidth availability of network 74.

Additionally or alternatively, retrieval unit 52 may be configured to receive data in accordance with a broadcast or multicast network protocol, such as eMBMS or IP multicast. In such examples, retrieval unit 52 may submit a request to join a multicast network group associated with particular media content. After joining the multicast group, retrieval unit 52 may receive data of the multicast group without further requests issued to server device 60 or content preparation device 20. Retrieval unit 52 may submit a request to leave the multicast group when data of the multicast group is no longer needed, e.g., to stop playback or to change channels to a different multicast group.

Network interface 54 may receive and provide data of segments of a selected representation to retrieval unit 52, which may in turn provide the segments to decapsulation unit 50. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Video encoder 28, video decoder 48, audio encoder 26, audio decoder 46, encapsulation unit 30, retrieval unit 52, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder audio encoder 26, audio decoder 46, encapsulation unit 30, retrieval unit 52, and/or decapsulation unit 50 may comprise an integrated circuit, a microprocessor, and/or a wireless communication device, such as a cellular telephone.

Client device 40, server device 60, and/or content preparation device 20 may be configured to operate in accordance with the techniques of this disclosure. For purposes of example, this disclosure describes these techniques with respect to client device 40 and server device 60. However, it should be understood that content preparation device 20 may be configured to perform these techniques, instead of (or in addition to) server device 60.

Encapsulation unit 30 may form NAL units comprising a header that identifies a program to which the NAL unit belongs, as well as a payload, e.g., audio data, video data, or data that describes the transport or program stream to which the NAL unit corresponds. For example, in H.264/AVC, a NAL unit includes a 1-byte header and a payload of varying size. A NAL unit including video data in its payload may comprise various granularity levels of video data. For example, a NAL unit may comprise a block of video data, a plurality of blocks, a slice of video data, or an entire picture of video data. Encapsulation unit 30 may receive encoded video data from video encoder 28 in the form of PES packets of elementary streams. Encapsulation unit 30 may associate each elementary stream with a corresponding program.

Encapsulation unit 30 may also assemble access units from a plurality of NAL units. In general, an access unit may comprise one or more NAL units for representing a frame of video data, as well audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 seconds. During this time interval, the specific frames for all views of the same access unit (the same time instance) may be rendered simultaneously. In one example, an access unit may comprise a coded picture in one time instance, which may be presented as a primary coded picture.

Accordingly, an access unit may comprise all audio and video frames of a common temporal instance, e.g., all views corresponding to time X. This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

A media presentation may include a media presentation description (MPD), which may contain descriptions of different alternative representations (e.g., video services with different qualities) and the description may include, e.g., codec information, a profile value, and a level value. An MPD is one example of a manifest file, such as manifest file 66. Client device 40 may retrieve the MPD of a media presentation to determine how to access movie fragments of various presentations. Movie fragments may be located in movie fragment boxes (moof boxes) of video files.

Manifest file 66 (which may comprise, for example, an MPD) may advertise availability of segments of representations 68. That is, the MPD may include information indicating the wall-clock time at which a first segment of one of representations 68 becomes available, as well as information indicating the durations of segments within representations 68. In this manner, retrieval unit 52 of client device 40 may determine when each segment is available, based on the starting time as well as the durations of the segments preceding a particular segment.

In accordance with the techniques of this disclosure, encapsulation unit 30 may generate data representative of portions of a media file that can be dropped (i.e., droppable portions) without negatively impacting remaining portions of the file. For instance, as discussed in greater detail with respect to FIG. 5 below, a droppable portion of a file may include each frame that is not used for reference or a group of frames including a frame that can be used for reference as well as all frames that can use the frame for reference. In some examples, a set of droppable portions may be defined such that the set includes each portion having a first frame at a particular temporal layer (i.e., having a temporal identifier (ID) of N) and all other frames at greater temporal layers (i.e., having temporal IDs greater than N) that can use the first frame for reference.

Encapsulation unit 30 may signal the droppable portions using byte ranges of the file. That is, for each droppable portion, encapsulation unit 30 may signal a starting byte and an ending byte corresponding to the first and last byte of the droppable portion. Encapsulation unit 30 may signal the droppable portions in a data structure of the file, for example, a segment index (sidx) box. Furthermore, encapsulation unit 30 may signal the droppable portions in a data structure that is external to video coding layer (VCL) data of the file, where the VCL data includes encoded video data, such as NAL units, access units, and the like. In this manner, a media application (or other target application) can identify the droppable portions without actually accessing the VCL data itself.

After encapsulation unit 30 has assembled NAL units and/or access units into a video file based on received data, encapsulation unit 30 passes the video file to output interface 32 for output. In some examples, encapsulation unit 30 may store the video file locally or send the video file to a remote server via output interface 32, rather than sending the video file directly to client device 40. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the video file to a computer-readable medium 34, such as, for example, a transmission signal, a magnetic medium, an optical medium, a memory, a flash drive, or other computer-readable medium.

Network interface 54 may receive a NAL unit or access unit via network 74 and provide the NAL unit or access unit to decapsulation unit 50, via retrieval unit 52. Decapsulation unit 50 may decapsulate a elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

In accordance with the techniques of this disclosure, network interface 54, retrieval unit 52 and/or decapsulation unit 50 may determine whether a received file (including one or more access units and/or one or more NAL units) has a suspect portion, that is, a portion that may include or actually includes errors. For example, network interface 54 may determine the potential presence of an error using cyclical redundancy check (CRC) bits. As another example, network interface 54 may determine the potential presence of an error using the application layer forward error correction (AL-FEC) protocol. In response to determining that a portion of a file is potentially erroneous, network interface 54 may identify the portion, e.g., by signaling byte range for the portion and/or by inserting markers into the file itself. The markers may be unique bit patterns, byte values, byte patterns, or the like that signify a start-of-suspect-portion and an end-of-suspect-portion. In addition, network interface 54 may identify the file as including a suspect portion, e.g., by modifying a file name for the file (e.g., changing the name to an illegal file name for an operating environment of client device 40) and/or by modifying a URL or URI for the file.

A media player, which may correspond to retrieval unit 52 and/or decapsulation unit 50, may receive the file as well as the indication of the suspect portion of the file. The media player may then use the droppable (also referred to herein as "removable") portions of the file to identify one or more of the removable portions that covers the suspect portion, and drop the identified one or more removable portions.

In this manner, client device 40 represents an example of a device for retrieving media data, the device including one or more processors configured to retrieve a file including media data, determine that a portion of the file is potentially erroneous, form data indicating that the file includes the portion that is potentially erroneous, and storing the file and the data to a location available to a target application(s) (also executed by the device).

In addition, client device 40 also represents an example of a device for processing media data, the device including one or more processors configured to receive a file including media data, receive a first set of information indicative of one or more removable portions of the file that can be removed from the file without preventing correct decoding of other portions of the media data, receive a second set of information indicative of a suspect portion of the file that is potentially erroneous, determine one or more of the removable portions that completely overlap the suspect portion, and remove the determined one or more removable portions from the file.

Furthermore, content preparation device 20 represents an example of a device for signaling information for media data, the device comprising one or more processors configured to obtain a file including media data, determine at least one portion of the media data that can be removed from the file without preventing correct decoding of other portions of the media data, and signal information that identifies the determined portion.

Figure 2:
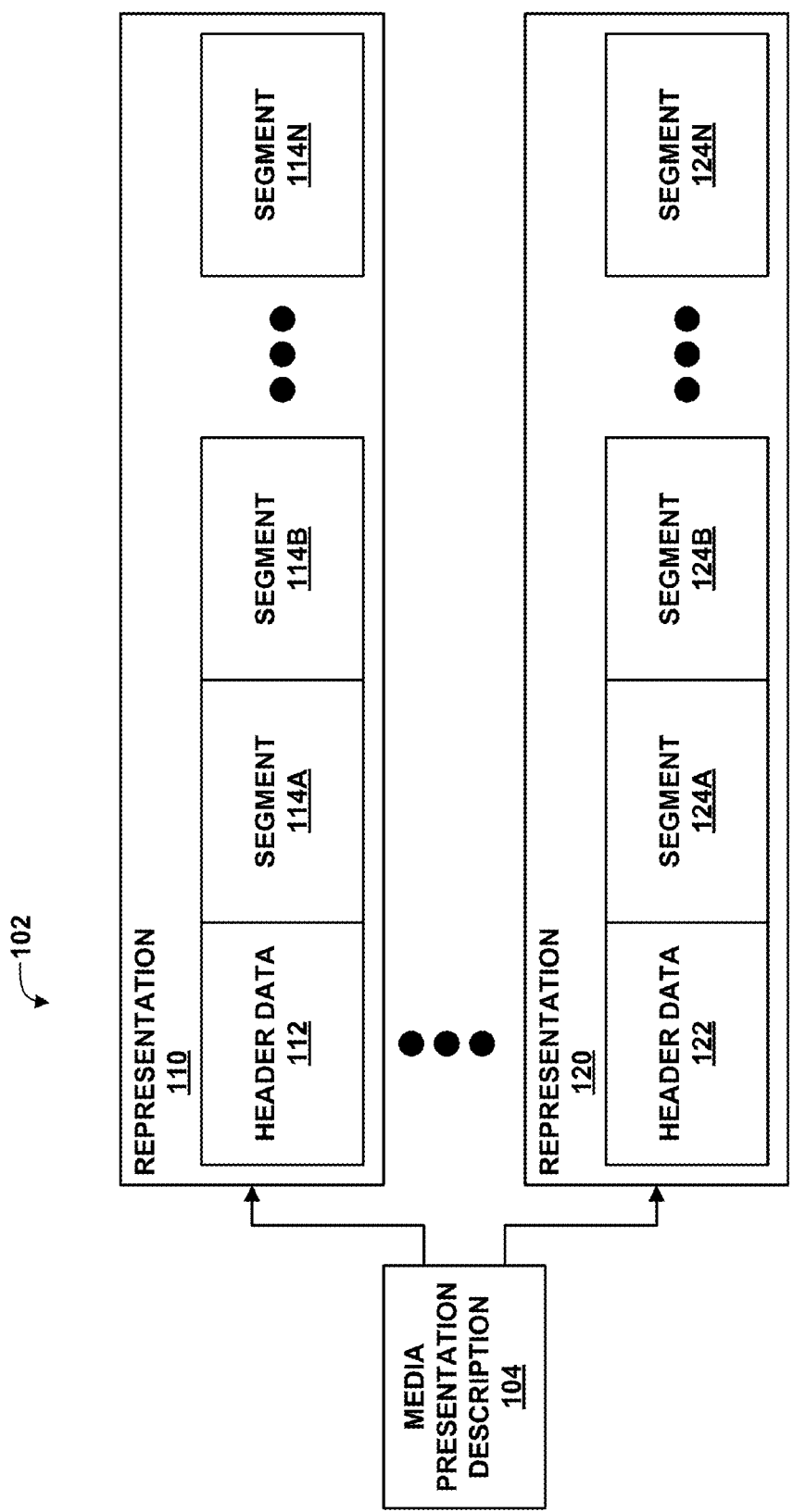
FIG. 2 is a conceptual diagram illustrating elements of example multimedia content.

FIG. 2 is a conceptual diagram illustrating elements of example multimedia content 102. Multimedia content 102 may correspond to multimedia content 64 (FIG. 1), or another multimedia content stored in memory 62. In the example of FIG. 2, multimedia content 102 includes media presentation description (MPD) 104 and a plurality of representations 110-120. Representation 110 includes optional header data 112 and segments 114A-114N (segments 114), while representation 120 includes optional header data 122 and segments 124A-124N (segments 124). The letter N is used to designate the last movie fragment in each of representations 110, 120 as a matter of convenience. In some examples, there may be different numbers of movie fragments between representations 110, 120.

MPD 104 may comprise a data structure separate from representations 110-120. MPD 104 may correspond to manifest file 66 of FIG. 1. Likewise, representations 110-120 may correspond to representations 68 of FIG. 1. In general, MPD 104 may include data that generally describes characteristics of representations 110-120, such as coding and rendering characteristics, adaptation sets, a profile to which MPD 104 corresponds, text type information, camera angle information, rating information, trick mode information (e.g., information indicative of representations that include temporal sub-sequences), and/or information for retrieving remote periods (e.g., for targeted advertisement insertion into media content during playback).

Header data 112, when present, may describe characteristics of segments 114, e.g., temporal locations of random access points (RAPS, also referred to as stream access points (SAPs)), which of segments 114 includes random access points, byte offsets to random access points within segments 114, uniform resource locators (URLs) of segments 114, or other aspects of segments 114. Header data 122, when present, may describe similar characteristics for segments 124. Additionally or alternatively, such characteristics may be fully included within MPD 104.

Segments 114, 124 include one or more coded video samples, each of which may include frames or slices of video data. Each of the coded video samples of segments 114 may have similar characteristics, e.g., height, width, and bandwidth requirements. Such characteristics may be described by data of MPD 104, though such data is not illustrated in the example of FIG. 2. MPD 104 may include characteristics as described by the 3GPP Specification, with the addition of any or all of the signaled information described in this disclosure.

Each of segments 114, 124 may be associated with a unique uniform resource locator (URL). Thus, each of segments 114, 124 may be independently retrievable using a streaming network protocol, such as DASH. In this manner, a destination device, such as client device 40, may use an HTTP GET request to retrieve segments 114 or 124. In some examples, client device 40 may use HTTP partial GET requests to retrieve specific byte ranges of segments 114 or 124.

In accordance with the techniques of this disclosure, segments 114, 124 may include one or more removable portions, also referred to herein as droppable portions. Furthermore, data of segments 114, 124, MPD 104, header data 112, 122, or other data may identify the removable portions of segments 114, 124. For instance, segments 114, 124 may include respective sidx boxes that identify the removable portions. As another example, extensible markup language (XML) data may identify the removable portions.

Figure 3:
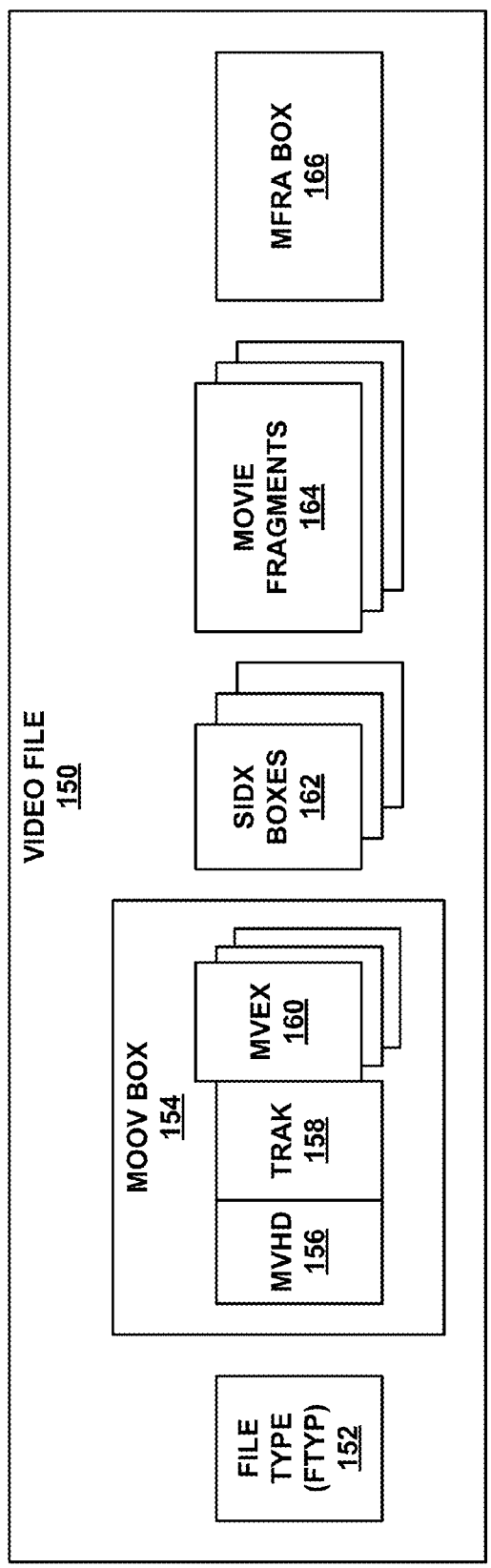
FIG. 3 is a block diagram illustrating elements of an example video file, which may correspond to a segment of a representation.

FIG. 3 is a block diagram illustrating elements of an example video file 150, which may correspond to a segment of a representation, such as one of segments 114, 124 of FIG. 2. Each of segments 114, 124 may include data that conforms substantially to the arrangement of data illustrated in the example of FIG. 3. Video file 150 may be said to encapsulate a segment. As described above, video files in accordance with the ISO base media file format and extensions thereof store data in a series of objects, referred to as "boxes." In the example of FIG. 3, video file 150 includes file type (FTYP) box 152, movie (MOOV) box 154, segment index (sidx) boxes 162, movie fragment (MOOF) boxes 164, and movie fragment random access (MFRA) box 166. Although FIG. 3 represents an example of a video file, it should be understood that other media files may include other types of media data (e.g., audio data, timed text data, or the like) that is structured similarly to the data of video file 150, in accordance with the ISO base media file format and its extensions.

File type (FTYP) box 152 generally describes a file type for video file 150. File type box 152 may include data that identifies a specification that describes a best use for video file 150. File type box 152 may alternatively be placed before MOOV box 154, movie fragment boxes 164, and/or MFRA box 166.

Figure 7:
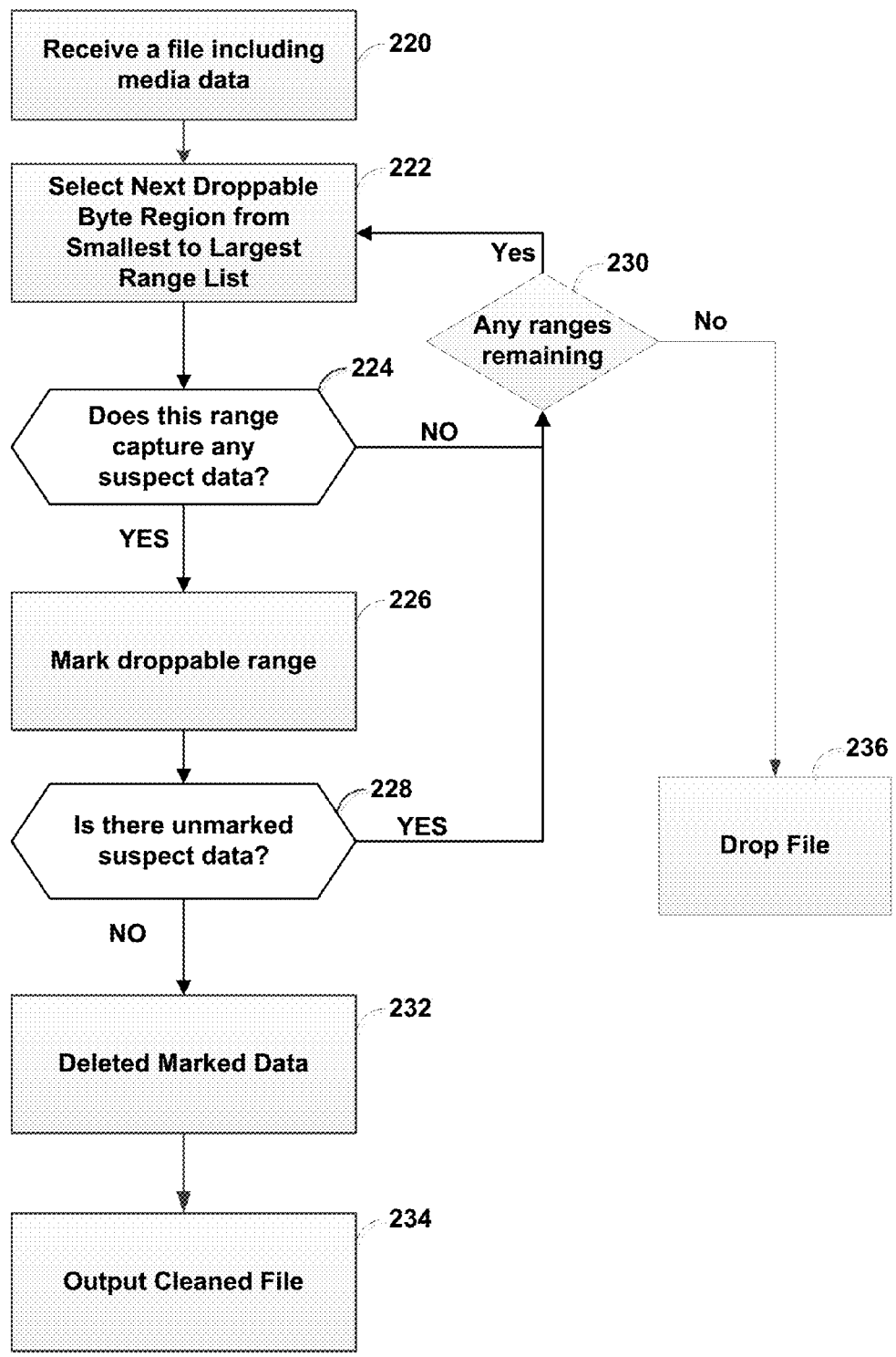
FIG. 7 is a flowchart illustrating an example method for performing techniques of this disclosure.

In some examples, a Segment, such as video file 150, may include an MPD update box (not shown) before FTYP box 152. The MPD update box may include information indicating that an MPD corresponding to a representation including video file 150 is to be updated, along with information for updating the MPD. For example, the MPD update box may provide a URI or URL for a resource to be used to update the MPD. As another example, the MPD update box may include data for updating the MPD. In some examples, the MPD update box may immediately follow a segment type (STYP) box (not shown) of video file 150, where the STYP box may define a segment type for video file 150. FIG. 7, discussed in greater detail below, provides additional information with respect to the MPD update box.

MOOV box 154, in the example of FIG. 3, includes movie header (MVHD) box 156, track (TRAK) box 158, and one or more movie extends (MVEX) boxes 160. In general, MVHD box 156 may describe general characteristics of video file 150. For example, MVHD box 156 may include data that describes when video file 150 was originally created, when video file 150 was last modified, a timescale for video file 150, a duration of playback for video file 150, or other data that generally describes video file 150.

TRAK box 158 may include data for a track of video file 150. TRAK box 158 may include a track header (TKHD) box that describes characteristics of the track corresponding to TRAK box 158. In some examples, TRAK box 158 may include coded video pictures, while in other examples, the coded video pictures of the track may be included in movie fragments 164, which may be referenced by data of TRAK box 158 and/or sidx boxes 162.

In some examples, video file 150 may include more than one track. Accordingly, MOOV box 154 may include a number of TRAK boxes equal to the number of tracks in video file 150. TRAK box 158 may describe characteristics of a corresponding track of video file 150. For example, TRAK box 158 may describe temporal and/or spatial information for the corresponding track. A TRAK box similar to TRAK box 158 of MOOV box 154 may describe characteristics of a parameter set track, when encapsulation unit 30 (FIG. 1) includes a parameter set track in a video file, such as video file 150. Encapsulation unit 30 may signal the presence of sequence level SEI messages in the parameter set track within the TRAK box describing the parameter set track.

MVEX boxes 160 may describe characteristics of corresponding movie fragments 164, e.g., to signal that video file 150 includes movie fragments 164, in addition to video data included within MOOV box 154, if any. In the context of streaming video data, coded video pictures may be included in movie fragments 164 rather than in MOOV box 154. Accordingly, all coded video samples may be included in movie fragments 164, rather than in MOOV box 154.

MOOV box 154 may include a number of MVEX boxes 160 equal to the number of movie fragments 164 in video file 150. Each of MVEX boxes 160 may describe characteristics of a corresponding one of movie fragments 164. For example, each MVEX box may include a movie extends header box (MEHD) box that describes a temporal duration for the corresponding one of movie fragments 164.

As noted above, encapsulation unit 30 may store a sequence data set in a video sample that does not include actual coded video data. A video sample may generally correspond to an access unit, which is a representation of a coded picture at a specific time instance. In the context of AVC, the coded picture include one or more VCL NAL units which contains the information to construct all the pixels of the access unit and other associated non-VCL NAL units, such as SEI messages. Accordingly, encapsulation unit 30 may include a sequence data set, which may include sequence level SEI messages, in one of movie fragments 164. Encapsulation unit 30 may further signal the presence of a sequence data set and/or sequence level SEI messages as being present in one of movie fragments 164 within the one of MVEX boxes 160 corresponding to the one of movie fragments 164.

Sidx boxes 162 are optional elements of video file 150. That is, video files conforming to the 3GPP file format, or other such file formats, do not necessarily include sidx boxes 162. In accordance with the example of the 3GPP file format, a sidx box may be used to identify a sub-segment of a segment (e.g., a segment contained within video file 150). The 3GPP file format defines a sub-segment as "a self-contained set of one or more consecutive movie fragment boxes with corresponding Media Data box(es) and a Media Data Box containing data referenced by a Movie Fragment Box must follow that Movie Fragment box and precede the next Movie Fragment box containing information about the same track." The 3GPP file format also indicates that a sidx box "contains a sequence of references to subsegments of the (sub)segment documented by the box. The referenced subsegments are contiguous in presentation time. Similarly, the bytes referred to by a Segment Index box are always contiguous within the segment. The referenced size gives the count of the number of bytes in the material referenced."

Sidx boxes 162 generally provide information representative of one or more sub-segments of a segment included in video file 150. For instance, such information may include playback times at which sub-segments begin and/or end, byte offsets for the sub-segments, whether the sub-segments include (e.g., start with) a stream access point (SAP), a type for the SAP (e.g., whether the SAP is an instantaneous decoder refresh (IDR) picture, a clean random access (CRA) picture, a broken link access (BLA) picture, or the like), a position of the SAP (in terms of playback time and/or byte offset) in the sub-segment, and the like.

In accordance with the techniques of this disclosure, sidx boxes 162 may include data that defines data regions of video file 150 that can be dropped without impacting other regions of video file 150. For instance, sidx boxes 162 may define one or more byte ranges of video file 150 that can be independently removed from video file 150 without impairing the ability of a video decoder, such as video decoder 48 (FIG. 1), to decode the remaining portions of video file 150. The byte ranges identify portions of video file 150 corresponding to respective subsets of movie fragments 164.

Movie fragments 164 may include one or more coded video pictures. In some examples, movie fragments 164 may include one or more groups of pictures (GOPs), each of which may include a number of coded video pictures, e.g., frames or pictures. In addition, as described above, movie fragments 164 may include sequence data sets in some examples. Each of movie fragments 164 may include a movie fragment header box (MFHD, not shown in FIG. 3). The MFHD box may describe characteristics of the corresponding movie fragment, such as a sequence number for the movie fragment. Movie fragments 164 may be included in order of sequence number in video file 150.

MFRA box 166 may describe random access points within movie fragments 164 of video file 150. This may assist with performing trick modes, such as performing seeks to particular temporal locations (i.e., playback times) within a segment encapsulated by video file 150. MFRA box 166 is generally optional and need not be included in video files, in some examples. Likewise, a client device, such as client device 40, does not necessarily need to reference MFRA box 166 to correctly decode and display video data of video file 150. MFRA box 166 may include a number of track fragment random access (TFRA) boxes (not shown) equal to the number of tracks of video file 150, or in some examples, equal to the number of media tracks (e.g., non-hint tracks) of video file 150.

In some examples, movie fragments 164 may include one or more stream access points (SAPs), such as IDR pictures. Likewise, MFRA box 166 may provide indications of locations within video file 150 of the SAPs. Accordingly, a temporal sub-sequence of video file 150 may be formed from SAPs of video file 150. The temporal sub-sequence may also include other pictures, such as P-frames and/or B-frames that depend from SAPs. Frames and/or slices of the temporal sub-sequence may be arranged within the segments such that frames/slices of the temporal sub-sequence that depend on other frames/slices of the sub-sequence can be properly decoded. For example, in the hierarchical arrangement of data, data used for prediction for other data may also be included in the temporal sub-sequence.

Moreover, the data may be arranged in a continuous sub-sequence, such that a single byte range may be specified in a partial GET request to retrieve all data of a particular segment used for the temporal sub-sequence. A client device, such as client device 40, may extract a temporal sub-sequence of video file 150 by determining byte-ranges of movie fragments 164 (or portions of movie fragments 164) corresponding to IDR and/or ODR pictures. As discussed in greater detail below, video files such as video file 150 may include a sub-fragment index box and/or a sub-track fragment box, either or both of which may include data for extracting a temporal sub-sequence of video file 150.

In this manner, sidx boxes 162 may describe the location of one or more SAPs and one or more droppable regions in data of video file 150, e.g., corresponding to movie fragments 164. The parsing logic of a media player may discard all ranges impacted by suspect data ranges or the minimum number of droppable ranges that encapsulates the suspect data.

Sidx boxes 162 may be terse or verbose. That is, sidx boxes 162 may describe all droppable frames or whatever the file formatter chooses to describe. For example, data describing only frame ranges of various numbers of frames (e.g., 3, 7, and 23) may be useful. Data describing only frame ranges would eliminate the one frame resolution for droppable data, but a single error sequence may be large enough that it always spans at least 3 frames. There is some potential balance between detail and benefit.

In addition, the subsegment index (ssix) may be present, which puts the data into levels that are decodable. The subsegment index is auxiliary data to define sample groups.

The ordering of the droppable ranges in sidx boxes 162 may be such that a parser of a media player may use the droppable regions in order. For example, droppable regions may be identified from smallest span (that is, smallest number of frames impacted) to largest. The parser could use a method such as that discussed with respect to FIG. 7 for this ordered list. Alternatively, the list could be delivered in an arbitrary order and sorted on the client device in order to apply the method of FIG. 7. That is, delivery order need not be smallest to largest. This is merely a convenience.

Figure 4:
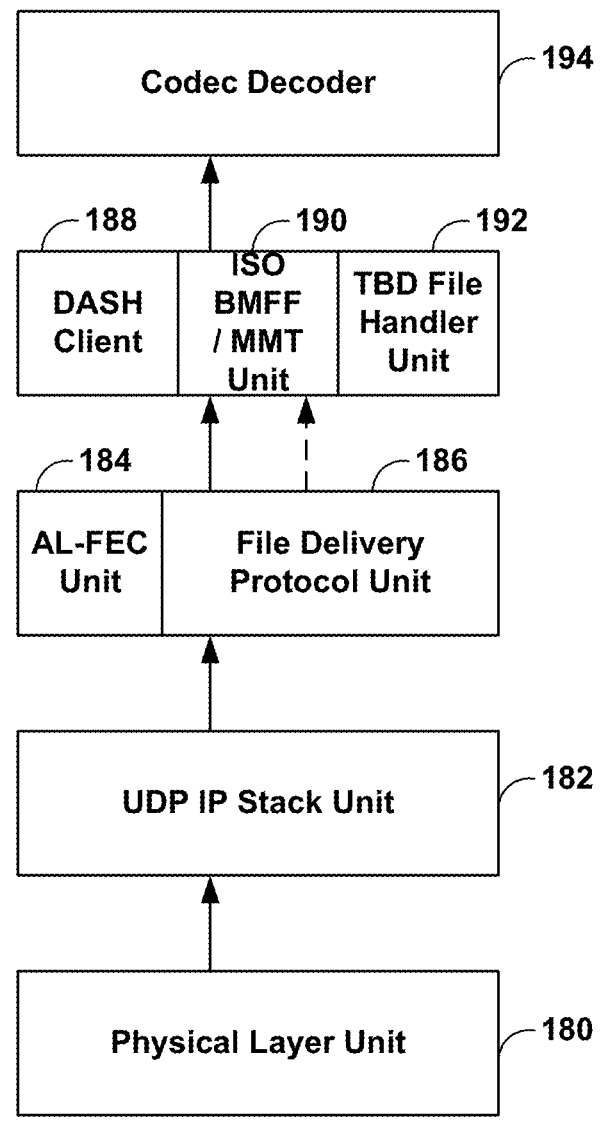
FIG. 4 is a conceptual diagram illustrating an example set of units for processing data of an Internet protocol (IP) stack.

FIG. 4 is a conceptual diagram illustrating an example set of units according to an Internet protocol (IP) stack. In this example, the set of units includes physical layer unit 180, user datagram protocol (UDP) IP stack unit 182, AL-FEC unit 184, file delivery protocol unit 186, Dynamic Adaptive Streaming over HTTP (DASH) client 188, ISO BMFF/MMT (MPEG Media Transport) unit 190, TBD file handler unit 192, and codec decoder 194. The units of FIG. 4 may generally correspond to elements of client device 40 of FIG. 1. For instance, physical layer unit 180, UDP IP stack unit 182, AL-FEC unit 184, and file delivery protocol unit 186 may correspond to network interface 54; DASH client 188, ISO BMFF/MMT unit 190, and TBD file handler unit 192 may correspond to retrieval unit 52 and/or decapsulation unit 50; and codec decoder 194 may correspond to video decoder 48.

The techniques herein may be applied to File Delivery over unidirectional Transport (FLUTE) protocol or other file delivery protocols as an extension or a future protocol. FLUTE 15 described in Paila et al., "FLUTE—File Delivery over Unidirectional Transport," Internet Engineering Task Force (IETF), RFC 6726, November 2012, available at tools.ietf.org/html/rfc6726. That is, file delivery protocol unit 186 may implement FLUTE or other such protocols. For example, file delivery protocol unit 186 may implement Real-Time Object Delivery over Unidirectional Transport (ROUTE) protocol. In general, ROUTE is a protocol for delivery of files over IP multicast networks using, inter alia, Asynchronous Layered Coding (ALC), Layered Coding Transport (LCT), and other well-known Internet standards. ROUTE generally provides an enhancement of and functional replacement for FLUTE with additional features.

This disclosure recognizes that there is a possibility that the interface between file delivery protocol unit 186 and file handler unit 192 may allow files containing lost or damaged data, i.e., errored files (that is, a file with suspect data), to be passed up the IP stack. This errored or suspect file interface is depicted by a dashed line between file delivery protocol unit 186 and file handler unit 192, whereas the correct/common interface is depicted with solid line(s). It is desirable and/or possibly required that the errored file supporting interface to be both optional and layering violation free. It is assumed that the original size, or at least the logical structure, and order of the source file are preserved. The delivery protocol typically assures these aspects. If these aspects are not preserved the file error management methods may not be capable of functioning properly.

If the receiver is built in a fully integrated manner, then the receiver may use proprietary interfaces to handle losses on the lower layers all the way up to the decoder. However, such integrated receivers are typically not common due to the modularity of the design and the implementation. Well-defined APIs and protocol interfaces across layers are important for a robust, interoperable, and extensible system.

In order to achieve the layering-violation-free design, the interface between file delivery protocol unit 186 and file handler unit 192 not need to determine the file type in order to operate, whether that be with or without performing error handling. Furthermore, the file handler should be able to correctly parse the file with errors, exclusively from the data contained within the errored file type, if at all.

DASH is described in INTERNATIONAL STANDARD ISO/IEC 23009-1 Second edition 2014-05-01 Information Technology—Dynamic Adaptive Streaming Over HTTP (DASH) Part 1: Media Presentation Description and Segment Formats. For the case of a file delivery streaming format such as DASH, the error management mechanisms of the file handler should also be independent of the target codec above the file handler (where the codec may correspond to, for example, H.264/AVC, H.265/HEVC, or other video coding standards or extensions thereof). In the case of 3GPP DASH, the file type may be exclusively ISO BMFF, as described in ISO/IEC 14496-12:2012(E), INTERNATIONAL STANDARD ISO/IEC 14496-12 Fourth edition 2012-07-15 Corrected version 2012-09-15, Information Technology—Coding of Audio-Visual Objects Part 12: ISO Base Media File Format.

The errored or damage file interface may be implemented with byte ranges or other similar means to describe the suspect regions. The file delivery protocol may generically describe the position of erased, or otherwise suspect, regions of a file of any arbitrary file type, without any knowledge of the file type. In addition or in the alternative, the interface may provide all information it receives. This may include, among other information:

the file type of the partially received object
 a unique identifier, such as a URL or a URI
 the nominal size of the partially received objects
 all received data and the position of the data in the object/file The interface may provide generic modification of the file name or access uniform resource locator (URL) or uniform resource identifier (URI) in a systematic and unambiguous manner to allow the subsequent layer to determine that this is in fact a suspect file variant. For example, file delivery protocol unit 186 may rename "Text.doc" as "Text.doc.err." The latter is an invalid file type in an operating environment such as Microsoft Windows. An error-unaware file handler will simply ignore the invalid file type. Additionally or alternatively, other file type signaling may be used, such as Internet Media Types. For partially received data, a new internet media type may be defined.

The interface from file delivery protocol unit 186 to a file handler may support passing a portion of a file that represents some logical subset of the entire file, the exact reason for the specific fragmentation being opaque to the file delivery protocol but the existence of actual fragmentation understood by the file packager and the file handler. The activity of such a feature may be communicated via labeling. This labeling may be similar to the systematic naming of files as suspect (i.e., renaming the files to names that may be illegal for the operating environment). These methods may be additive, i.e., a file may be marked as a chunk and a chunk may be labeled as suspect. The file delivery protocol may include the identification method of the presence of a feature such as chunking in the delivery. The definition of the method for identifying suspect may be included in the definitional aspects provided to the file delivery protocol packager on the network side, or a single predefined method may be used. A target application may examine one or two chunks to see if the method becomes apparent.

The specific method, e.g., chunk1, chunk2, or chunk3 may be incorporated in the labeling of the chunk. The file delivery mechanism does not necessarily understand the method. The label may serve as communications between source application on network side and device application on the device side. If the application stops taking chunks, the device side file handler may stop posting them. The whole file may be posted, so backwards compatibility to applications that work with whole files only is maintained. Additional details of these techniques are described with respect to FIG. 8 below. The use of application consumption to influence continued chunk posting is optional and may save output memory space.

There is an objective for this type of streaming media file interface that unused, e.g., Media Segment files, be deleted if they are not otherwise removed from the file protocol output buffer after some elapsed time, in order to prevent so called memory leaks. This objective may also be extended to the invalid error marked files.

As described above, the file type of 3GPP DASH currently described by ISO/IEC 14496-12:2012, known as ISO BMFF. In order to meet the objective of layering independence, the file handler should be able to parse the contained media in a manner that is independent of the target codec. This in turn results in an objective that the file format can describe codec syntax in a generic manner that will allow processing without sensitivity to the actual codec type. This in turn may allow the file handling layer to be replaced without requiring replacement of the file handler, codec, and/or any other layer.

There are a few methods suitable for this application these may be loosely defined as being descriptive or errored or suspect data replacement. In the former category the "suspect regions" of the file are enumerated in the interface, e.g., by file delivery protocol unit 186. There are a number of methods to describe a byte range, for example "range=1876-23456." A "replacement" method might utilize so called escape sequences. The locations of the missing source data may be denoted by substitution codes.

SAPs are relevant for starting playout of media segments after tune in or at switching (e.g., switching between Representations). SAPs have an associated position, a presentation time, and a type, such that the file handler can initiate the decoding and presentation process from a SAP onwards. Using this, typically information from SAPs onward can be used for correct presentation of at least from the SAP.

SAPs may be signalled by different means. One way is to provide a signaling that each segment starts with a SAP of type 1 or 2, i.e., the first sample in decode order in the segment can be played independently of any other data. Other SAP signaling may be provided.

In the context of DASH, the ISO BMFF specification contains a directory structure known as a segment index (sidx). Among other things, this structure describes the locations and types of generic stream access points (SAPs). "Generic" in this context means not specific to any particular codec. This directory structure is suitable for defining droppable (or removable) regions.

The basic concept is droppable regions. The current SAP location description allows the location of a point in the file at which the player (codec) can be started cleanly. These additions would specify the regions which are droppable. The use of the term "region" is not intended as the specific method, but rather a descriptive term.

This disclosure describes, for purposes of example, the presence of the Segment Index for locating SAPs. However, instead of Segment Index, the SAP may also be determined by other means such as the MPD indicating startsWithSAP or by profile signaling.

Figure 5:
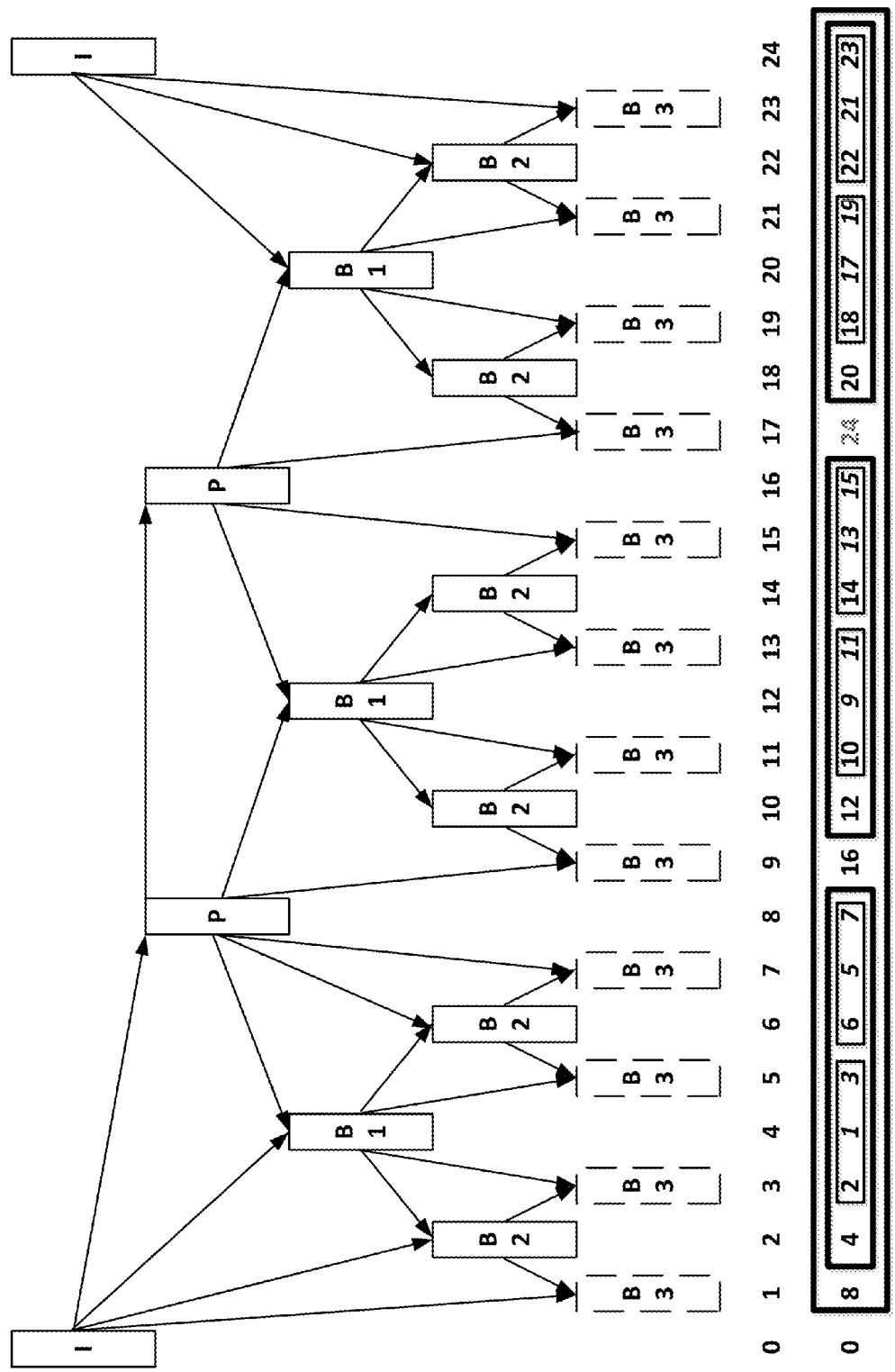
FIG. 5 is a conceptual diagram illustrating example use cases for the techniques of this disclosure.

FIG. 5 is a conceptual diagram illustrating example use cases for the techniques of this disclosure. FIG. 5 depicts a so called hierarchical B type of layered codec references to video frames for which certain grouping of frames can be droppable. The first row of numbers at the bottom of the figure is in display order (sometimes referred to as output order). The bottom row of numbers is in delivery order, also called decode order. The numbers may represent relative or actual picture order count (POC) values for the frames.

For this particular structure of frame references, the italicized numbers (1, 3, 5, 7, 9, 11, 13, 15, 17, 19, 21, and 23) in the second row of numbers represent frames that can be dropped individually. The outlines for these frames (generally labeled "B3" because these are B-frames at layer 3 of the coding hierarchy) are also dashed lines, representing that these frames can be dropped individually. These frames can be dropped individually because no other frames will use these frames for reference.

FIG. 5 also shows several groups of three frames (groups {2, 1, 3}, {6, 5, 7}, {10, 9, 11}, {14, 13, 15}, {18, 17, 19}, and {22, 21, 23}) that may be dropped in groups of three frames. These groups are outlined by respective boxes in the second row of numbers. In other words, if frame 2 is dropped, frames 1 and 3 are also dropped, because frames 1 and 3 may depend on (that is, be predicted relative to) frame 2, as shown in the hierarchy of FIG. 5. Additionally, FIG. 5 shows several groups of seven frames (groups {4, 2, 1, 3, 6, 5, 7}, {12, 10, 9, 11, 14, 13, 15}, and {20, 18, 17, 19, 22, 21, 23}) that may be dropped in groups of seven frames. In other words, if frame 4 is dropped, frames 2, 1, 3, 6, 5, and 7 are also dropped, again, because any or all of frames 2, 1, 3, 6, 5, and/or 7 may depend on frame 4, directly or indirectly.

Furthermore, FIG. 5 shows a group of frames {8, 4, 2, 1, 3, 6, 5, 7, 16, 12, 10, 9, 11, 14, 13, 15, 20, 18, 17, 19, 22, 21, 23} that may be dropped as a group. Although frame 24 is included in this box, it should be understood that frame 24 itself is not actually be dropped even when this group is dropped, because frame 24 forms part of a subsequent segment. Should a fraction of frame 24 be suspect, the subsequent Segment would be dropped entirely. This is functionally equivalent to frame 0 containing suspect data for the Segment containing frames 1-23. Thus, FIG. 5 uses light grey text to represent frame 24 in the second row of numbers. Although frame 24 is not dropped with the decoder-order-adjacent frames, if there is an error with either or both of frames 8 and/or 16, frames 20-23 would be dropped, because these frames may depend on (that is, be predicted from, directly or indirectly) frames 8 and/or 16. Should frame 24 be suspect, the seven preceeding frames in presentation order must be dropped, unless there is no reference to 24 in frames 20, 22, and 23, which is not depicted.

Figure 6:
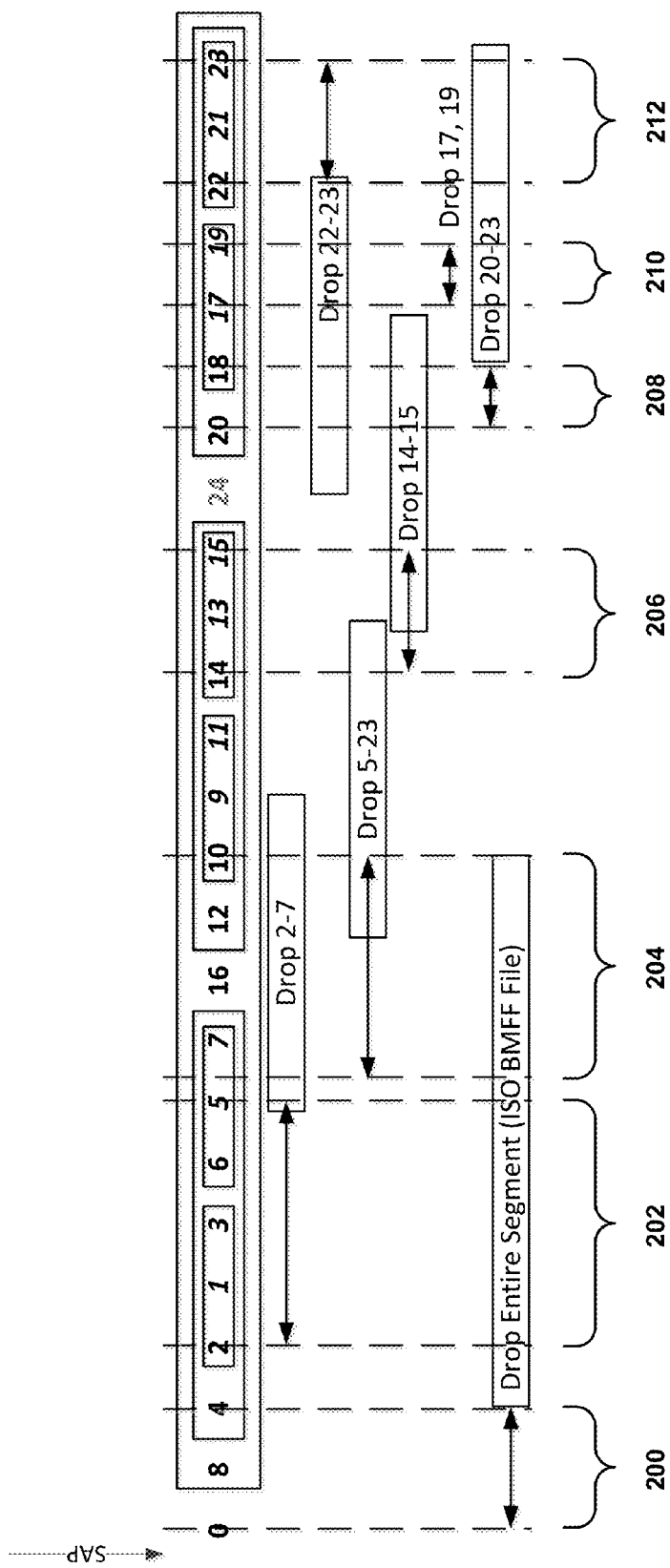
FIG. 6 is a conceptual diagram that illustrates further example use cases of the techniques of this disclosure.

FIG. 6 is a conceptual diagram that illustrates further example use cases of the techniques of this disclosure. In particular, FIG. 6 portrays various examples of portions 200-212 as well as indications of what data would be dropped, in accordance with the techniques of this disclosure, when such suspect regions result. FIG. 6 depicts error patterns superimposed upon the delivered frame sequence of FIG. 5. FIG. 6 depicts the frames in time i.e. playback is often linear in time. The data size for the frames is not necessarily constant. So, the errors (suspect portions) drawn in time span are not necessarily of linear data size. The span of a black double headed arrow is merely intended to depict the time range impacted in the data.

In one example, the allowable condition for partial file playback is that no portion of a corresponding suspect portion (represented by respective black arrows) falls outside droppable data. Frame 24, as discussed above, is a special case because it resides in the next segment, and is depicted in gray as a consequence. No loss in this file will impact frame 24.

The data that is dropped as a result of each of suspect regions 200-212 is described below, as examples of the techniques of this disclosure:

If portion 200 is marked as suspect (which includes data for frames 0, 8, and 4), the entire file is dropped. That is, frame 0 is included in a non-droppable region, and therefore, the entire media segment (ISO BMFF file) is dropped.

If portion 202 is marked as suspect, the suspect region impacts the two three-frame-groups {2, 1, 3} and {6, 5, 7}. Thus, these two groups are dropped in this example. Although portion 202 does not actually touch frame 7, frame 7 is within the removable group {6, 5, 7} (because frame 7 may depend on/be predicted from frame 6), and thus, frame 7 is also dropped in this example.

If portion 204 is marked as suspect, the suspect region impacts frames 5, 7, 16, 12, and 10. In this example, frames 5-23 (i.e., frames 5, 7, 16, 12, 10, 9, 11, 14, 13, 15, 20, 18, 17, 19, 22, 21 and 23) are dropped as a result.

If portion 206 is marked as suspect, the suspect region impacts group {14, 13, 15}, and therefore, this group of frames is dropped in this example.

If portion 208 is marked as suspect, the suspect region impacts frame 20, which means that the seven frame group {20, 18, 17, 19, 22, 21, 23} is dropped in this example.

If portion 210 is marked as suspect, the suspect region impacts frames 17 and 19. These frames are individually droppable, as indicated by the italicized text in FIG. 6. Thus, frames 17 and 19 are dropped in this example.

If portion 212 is marked as suspect, the suspect region impacts the three frame group {22, 21, 23}. Since this group of frames is a droppable group, frames, 22, 21, and 23 are dropped in this example.

As alternative examples, rather than defining droppable regions, data may be provided that signals playable regions. That is, playable regions may be defined. Such playable regions show the data that can still be played in contrast to an operation for which the entire segment is dropped. The current SAP location description allows the location of a point in the file at which the player (codec) can be started cleanly. These additions would specify the regions that are playable. The basic concept is that as long as all data of one group is received, the data can be played.

In this example, if portion 200 is suspect, the media segment is not playable because the suspect region impacts frame 0.

If region 202 is suspect, frames 0, 8, 4, and 16-23 (i.e., frames 0, 8, 4, 16, 12, 10, 9, 11, 14, 13, 15, 20, 18, 17, 19, 22, 21 and 23) are playable, and marked as such.

If region 204 is suspect, frames 0-6 (i.e., frames 0, 8, 4, 2, 1, 3, 6) are playable, and marked as such.

If region 206 is suspect, frames 0-11 (i.e., frames 0, 8, 4, 2, 1, 3, 6, 5, 7, 16, 12, 10, 9 and 11) and 24-23 (i.e., frames 24, 20, 18, 17, 19, 22, 21 and 23) are playable, and marked as such.

If region 208 is suspect, frames 0-24 (i.e., frames 0, 8, 4, 2, 1, 3, 6, 5, 7, 16, 12, 10, 9, 11, 14, 13, 15 and 24) are playable, and marked as such.

If region 210 is suspect, frames 0-18 (i.e., frames 0, 8, 4, 2, 1, 3, 6, 5, 7, 16, 12, 10, 9, 11, 14, 13, 15, 24, 20, 18) and 22-23 (i.e., frames 22, 21, 23) are playable, and marked as such.

If region 212 is suspect, frames 0-19 (i.e., frames 0, 8, 4, 2, 1, 3, 6, 5, 7, 16, 12, 10, 9, 11, 14, 13, 15, 24, 20, 18, 17 and 19) are playable, and marked as such.

FIG. 7 is a flowchart illustrating an example method for performing techniques of this disclosure. The method of FIG. 7 may be performed by retrieval unit 52 and/or decapsulation unit 50 of client device 40 (FIG. 1). As another example, the method of FIG. 7 may be performed by a media player application executed by a processor of client device 40. For purposes of example, the method of FIG. 7 is explained with respect to retrieval unit 52.

Initially, retrieval unit 52 receives a file including media data (220). The file may conform to video file 150 (FIG. 3). For example, the file may include a sidx box that indicates droppable (removable) portions, e.g., identified using byte ranges. The file may also be marked as including a suspect portion. For example, the file may be renamed as discussed above to include ".err" following the file name. As another example, a URL or URI for the file may be modified. Data for the file may also identify the suspect portion of the file, e.g., using a byte range of the file.

Retrieval unit 52 may select a next (e.g., first) droppable byte region from a list, ordered smallest to largest, of droppable (removable) regions (222). As discussed above, this list may be provided by a sidx box of the file. Alternatively, the list may be provided in the form of XML data, e.g., in a header of the file or as side information for the file. With respect to the example of FIG. 5, the first selected range (the smallest range) corresponds to a single frame, e.g., frame 1.

Retrieval unit 52 then determines whether this selected droppable range captures any of the suspect data (224). If the selected range does capture suspect data ("YES" branch of 224), retrieval unit 52 may mark the droppable range as to be dropped (226) and then determine whether any unmarked suspect data remains (228).

If unmarked suspect data remains ("YES" branch of 228) or if the selected range does not capture any suspect data ("NO" branch of 224), retrieval unit 52 determines whether there are any more ranges remaining (230). If there are more ranges remaining ("YES" branch of 230), retrieval unit 52 selects a next range from the available ranges and iterates through the marking loop again. On the other hand, if there are no more ranges remaining ("NO" branch of 230), retrieval unit 52 drops the file (236).

If no unmarked suspect data remains ("NO" branch of 228), that is, the selected range(s) cover the entire suspect portion, retrieval unit 52 deletes the marked data (232) and outputs the cleaned file (234).

In this manner, the method of FIG. 7 represents an example of a method including receiving a file including media data, receiving a first set of information indicative of one or more removable portions of the file that can be removed from the file without preventing correct decoding of other portions of the media data, receiving a second set of information indicative of a suspect portion of the file that is potentially erroneous, determining one or more of the removable portions that completely overlap the suspect portion, and removing the determined one or more removable portions from the file.

There are codecs that include internal error tolerance features. If the file handler is configured with information indicating that the corresponding decoder supports such error tolerance features, e.g., from the mime type that the codec above it supports these features and the support is not optional, then the file format may incorporate an optional description of regions that are error tolerant. Given this sort of descriptive directory structure, possibly implemented in XML in the sidx, the handler may choose to pass some suspect data.

The existing SAP locations, as for example included in the sidx box, are suitable to creating a layering clean method for removal of suspect data from ISO BMFF files. However, the techniques of this disclosure are not exclusive to ISO BMFF files. Rather, ISO BMFF happens to have a suitable directory structure for enabling such a generic method. The methods described herein are generic with respect to file type, and discuss ISO BMFF as a specific example.

Figure 8:
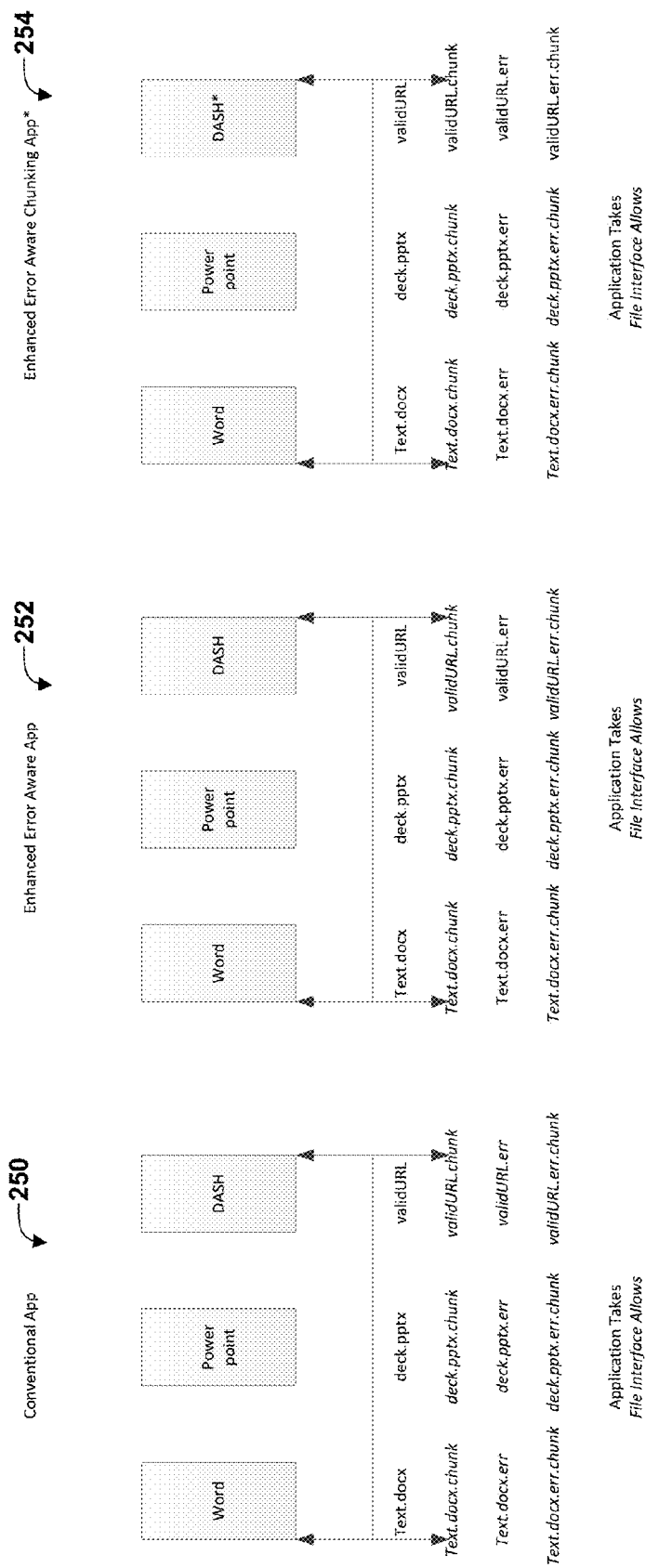
FIG. 8 is a conceptual diagram illustrating various examples of chunk-based delivery of files for various types of applications.

FIG. 8 is a conceptual diagram illustrating various examples of chunk-based delivery of files for various types of applications. In particular, as discussed above, a file delivery interface may provide for delivery of chunks of a file as well as a whole file reassembled from the chunks. The chunks and the file may or may not be labeled as including errors. FIG. 8 depicts the types of files and file chunks various types of applications may be capable of accepting. Italicized text represents file types that a file interface allows, while non-italicized text represents files that the application recognizes as valid (i.e., that the application accepts).

In a first example 250, applications only accept files that are fully assembled and error free. These applications may be described as conventional applications. In other words, if a file is marked with anything other than a valid file name, the applications will not accept that file.

In a second example 252, applications are configured to recognize and handle files including errors, e.g., a file marked with ".err" as an extension to the file name, in accordance with the techniques discussed above. For example, if such a file includes removable portions that can be dropped without preventing successful processing (e.g., decoding) of other portions and information indicative of a suspect portion, the applications in example 252 can drop one or more of the removable portions as discussed above, e.g., with respect to the method of FIG. 7.

As a third example 254, a file may be delivered in chunks. That is, chunks may be made available to a target application, such as a DASH client. If the target application is capable of recognizing and interpreting the chunks, the target application may retrieve and process the chunks of the file, rather than waiting for the file to be reassembled from the chunks. In some examples, the chunks may be provided in a location that is accessible to the target application, and after all chunks have been received, the file may be reassembled and also made available to the application. The chunks may be labeled as including a suspect portion in accordance with other techniques of this disclosure. A chunk may be identified as a chunk using a file naming scheme, e.g., the extension ".chunk" to a file name for the chunk. Further the actual naming of chunks may be an agreement between the generating application and the receiving application. For example, the file might be xyz.file, but posted chunk names may be xyz.file.method1.0, xyz-.file.method1.1, xyz.file.method1.2 etc. This naming scheme may be preconfigured for interactions between the applications/units. The delivery protocol need not interpret the file names. Instead, the delivery protocol unit may be configured to add "method1.n" or the like to these chunks. Chunk locations may be indicated to the transmitting file handler, but the file handler need not interpret the particular chunking method, e.g., method1.

Figure 9:
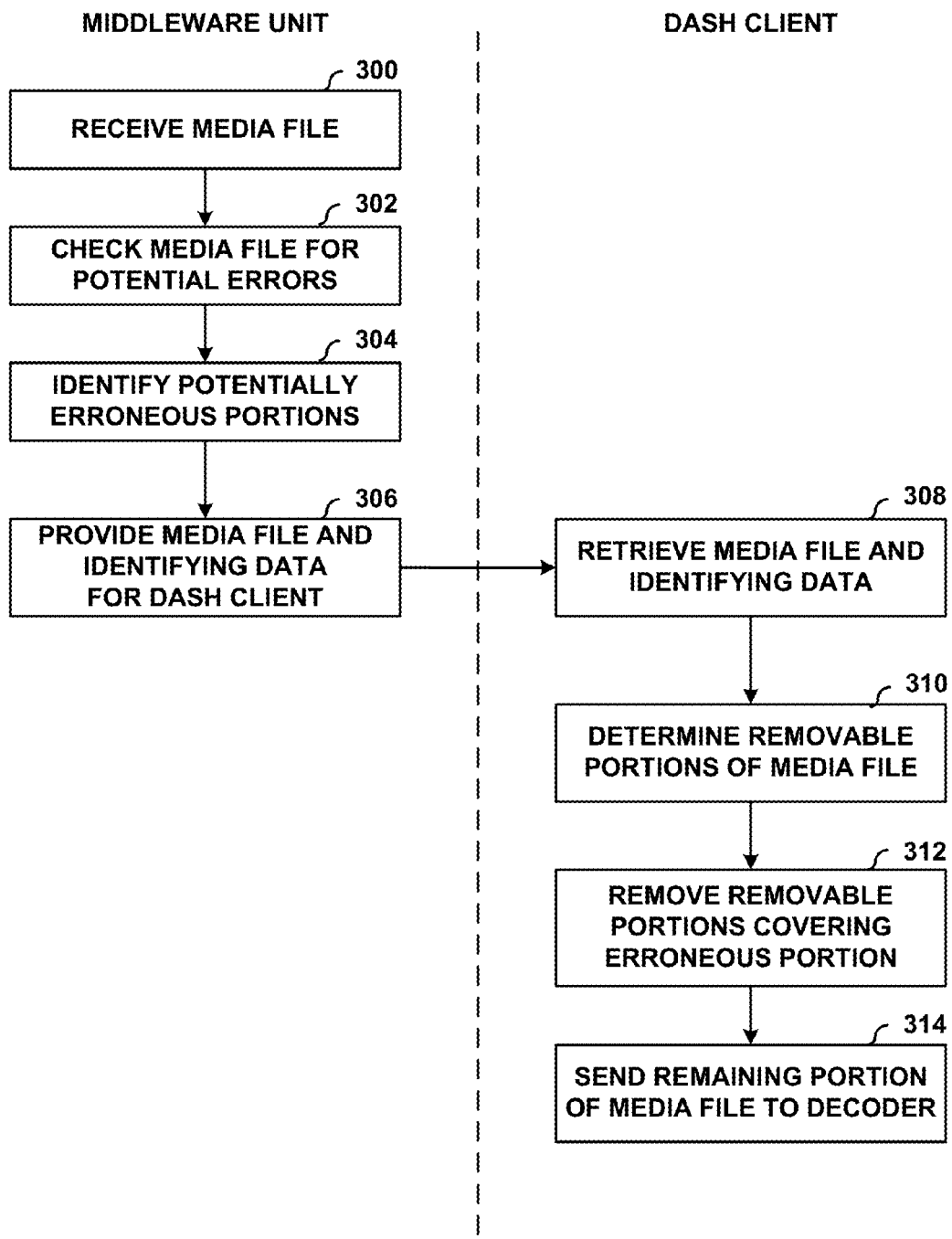
FIG. 9 is a flowchart illustrating another example method in accordance with the techniques of this disclosure.

FIG. 9 is a flowchart illustrating another example method in accordance with the techniques of this disclosure. The example method of FIG. 9 is performed by two separate units: a middleware unit (e.g., file delivery protocol unit 186 of FIG. 4) and a DASH client (e.g., DASH client 188). However, it should be understood that other units or devices of this disclosure, or similar devices or units, may be configured to perform the various elements of the method of FIG. 9. For example, ISO BMFF/MMT unit 190 or file handler unit 192 of FIG. 4 may perform the elements of this example method attributed to the DASH client.

In this example, initially, the middleware unit receives a media file (300). The media file may include data representative of removable portions thereof, such as in a segment index (SIDX) box of the media file or other header data of the file. Although not shown in FIG. 9, the middleware may also receive a manifest file including metadata that describes a plurality of media files including the received media file. In some examples, the manifest file may indicate the removable portions of the file. The portions of the file that are removable may be those portions that can be removed without impacting the decodability of the remaining portions of the file, e.g., as explained with respect to the examples of FIGS. 5 and 6.

The middleware unit then checks the media file for potential errors (302). For example, the middleware unit may use CRC bits of packets associated with the media file to determine whether one or more of the packets include errors. Additionally or alternatively, the middleware unit may apply an application layer forward error correction (AL-FEC) protocol to the packets and/or the media file to determine whether the media file includes potentially erroneous data.

In response to determining that the media file includes potentially erroneous data, the middleware unit forms data that identifies the potentially erroneous portions of the media file (304). For example, the middleware unit may insert markers into the file indicative of the start(s) and end(s) of the erroneous portion(s) of the media file. Additionally or alternatively, the middleware unit may generate data that identifies locations of the potentially erroneous data, such as byte ranges for the potentially erroneous data. In any case, the middleware unit then provides the media file and the data identifying the potentially erroneous portion(s) of the media file for the DASH client (306). For example, the middleware unit may make the media file available for the DASH client to retrieve, e.g., acting as a proxy server that is responsive to GET and partial GET requests from the DASH client. Furthermore, the middleware unit may advertise that the media file is available, e.g., in a manifest file.

The DASH client may subsequently retrieve the media file, as well as the identifying data (308), that is, the data that identifies potentially erroneous portions of the media file. The DASH client determines removable portions of the media file (310), e.g., from a manifest file for the media file or from header data (e.g., a SIDX box) of the media file. Furthermore, using the identifying data from the middleware unit, the DASH client removes removable portions that cover the erroneous portion(s) of the media file (312). That is, the DASH client may remove the smallest amount of removable data possible such that the erroneous portion(s) of the media file are completely removed. In this manner, the DASH client produces a modified media file, including only the remaining portions of the received media file (i.e., those portions that were not removed and that were not signaled as being erroneous). The DASH client then sends the remaining portion (i.e., the modified media file) to a decoder, e.g., a video decoder, such as video decoder 48 (FIG. 1) or an audio decoder, such as audio decoder 46 (FIG. 1).

In this manner, the method of FIG. 9 represents an example of a method including receiving a file including media data, determining that a portion of the file is potentially erroneous, forming error-indicative data indicating that the file includes the portion that is potentially erroneous, and storing the file and the error-indicative data to a location available to a target application for the media data of the file.

Likewise, the method of FIG. 9 represents an example of a method including obtaining a file including media data, determining at least one portion of the media data that can be removed from the file without preventing correct decoding of other portions of the media data, and signaling information that identifies the determined portion.

Furthermore, the method of FIG. 9 represents an example of a method including receiving a file including media data, receiving a first set of information indicative of one or more removable portions of the file that can be removed from the file without preventing correct decoding of other portions of the media data, receiving a second set of information indicative of a suspect portion of the file that is potentially erroneous, determining one or more of the removable portions that completely overlap the suspect portion, and removing the determined one or more removable portions from the file.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Various examples have been described. These and other examples are within the scope of the following claims.

What is claimed is:

1. A method of receiving media data, the method comprising, by a file delivery protocol unit implemented in circuitry:
   receiving, according to a file delivery protocol, a file including media data, the file conforming to International Organization for Standardization (ISO) Base Media File Format or an extension to the ISO Base Media File Format, and the file excluding network-layer packet header information;
   after receiving the file, determining that a portion of the file is potentially erroneous;
   in response to determining that the portion of the file is potentially erroneous, forming error-indicative data indicating that the file includes the portion that is potentially erroneous; and
   storing the file, a set of information indicative of one or more removable portions of the file that can be removed from the file without preventing correct decoding of media data of other portions of the file, and the error-indicative data to a location available to a target application for the media data of the file.

2. The method of claim 1, wherein forming the error-indicative data comprises forming data that identifies the portion that is potentially erroneous.

3. The method of claim 2, wherein forming the error-indicative data comprises forming data that identifies a byte range corresponding to the portion that is potentially erroneous.

4. The method of claim 2, wherein forming the error-indicative data comprises inserting a first marker at a beginning of the portion that is potentially erroneous within the file and inserting a second marker at an ending of the portion that is potentially erroneous within the file.

5. The method of claim 1, wherein forming the error-indicative data comprises renaming the file to indicate that the file includes the portion that is potentially erroneous.

6. The method of claim 5, wherein renaming the file comprises adding a file name extension to a file name of the file that is illegal for an operating environment in which the target application executes.

7. The method of claim 5, wherein renaming the file comprises modifying a uniform resource locator (URL) or a uniform resource identifier (URI) for the file.

8. The method of claim 1, wherein forming the error-indicative data comprises providing a particular Internet Media type for the file.

9. The method of claim 1, wherein the target application comprises a Dynamic Adaptive Streaming over HTTP (DASH) application.

10. The method of claim 1, wherein the target application is configured to process High-Level Syntax (HLS) data of the file for a corresponding codec.

11. The method of claim 1, wherein receiving the file comprises receiving the file using one of File Delivery over Unidirectional Transport (FLUTE) protocol or Real-Time Object Delivery over Unidirectional Transport (ROUTE) protocol.

12. The method of claim 1, further comprising receiving information from the target application indicating that the target application supports removal of suspect portions of files.

13. The method of claim 12, wherein receiving the information comprises receiving the information as at least one of an HTTP extension header, an argument in a request for data of the file, or part of an HTTP request for data of the file.

14. A method of processing media data, the method comprising, by a processor implemented in circuitry:
receiving a file including media data, the file conforming to International Organization for Standardization (ISO) Base Media File Format or an extension to the ISO Base Media File Format, and the file excluding network-layer packet header information;
receiving a first set of information indicative of one or more removable portions of the file that can be removed from the file without preventing correct decoding of other portions of the media data;
receiving a second set of information indicative of a suspect portion of the file that is potentially erroneous;
determining one or more of the removable portions that completely overlap the suspect portion; and
removing the determined one or more removable portions from the file.

15. The method of claim 14, further comprising receiving a third set of information indicating that the file includes the suspect portion, wherein determining the one or more of the removable portions comprises determining the one or more of the removable portions based on the third set of information.

16. The method of claim 15, wherein the third set of information comprises at least one of a file name extension to a file name of the file that is illegal for an operating environment, a modified uniform resource locator (URL) or a modified uniform resource identifier (URI) for the file.

17. The method of claim 14, wherein the first set of information comprises at least one of a segment index (SIDX) box of the file, extensible markup language (XML) data, byte ranges of the file corresponding to the portions, or information outside of video coding layer (VCL) data of the file.

18. The method of claim 14, wherein the second set of information comprises at least one of:
a byte range of the file corresponding to the suspect portion; or
a first marker within the file at a beginning of the suspect portion and a second marker within the file at an ending of the suspect portion.

19. The method of claim 14, further comprising sending the remaining portions of the file to a decoder.

20. A device for processing media data, the device comprising one or more processors, implemented in circuitry, configured to:
receive, according to a file delivery protocol, a file including media data, the file conforming to International Organization for Standardization (ISO) Base Media File Format or an extension to the ISO Base Media File Format, and the file excluding network-layer packet header information;
after receiving the file, determine that a portion of the file is potentially erroneous;
in response to determining that the portion of the file is potentially erroneous, form error-indicative data indicating that the file includes the portion that is potentially erroneous; and
store the file, a set of information indicative of one or more removable portions of the file that can be removed from the file without preventing correct decoding of media data of other portions of the file, and the error-indicative data to a location available to a target application for the media data of the file.

21. The device of claim 20, wherein the one or more processors are configured to form the error-indicative data to identify the portion that is potentially erroneous.

22. The device of claim 20, wherein to form the error-indicative data, the one or more processors are configured to rename the file to indicate that the file includes the portion that is potentially erroneous.

23. The device of claim 20, wherein to form the error-indicative data, the one or more processors are configured to provide a particular Internet Media type for the file.

24. The device of claim 20, wherein the target application comprises a Dynamic Adaptive Streaming over HTTP (DASH) application.

25. A device for processing media data, the device comprising one or more processors configured to:
receive a file including media data, the file conforming to International Organization for Standardization (ISO) Base Media File Format or an extension to the ISO Base Media File Format, and the file excluding network-layer packet header information;
receive a first set of information indicative of one or more removable portions of the file that can be removed from the file without preventing correct decoding of other portions of the media data;
receive a second set of information indicative of a suspect portion of the file that is potentially erroneous;
determine one or more of the removable portions that completely overlap the suspect portion; and
remove the determined one or more removable portions from the file.

26. The device of claim 25, wherein the one or more processors are further configured to receive a third set of information indicating that the file includes the suspect portion, wherein the one or more processors are configured to determine the one or more of the removable portions based on the third set of information, and wherein the third set of information comprises at least one of a file name extension to a file name of the file that is illegal for an operating environment, a modified uniform resource locator (URL) or a modified uniform resource identifier (URI) for the file.

27. The device of claim 25, wherein the first set of information comprises at least one of a segment index (SIDX) box of the file, extensible markup language (XML) data, byte ranges of the file corresponding to the portions, or information outside of video coding layer (VCL) data of the file.

28. The device of claim 25, wherein the second set of information comprises at least one of a byte range of the file corresponding to the suspect portion or a first marker within the file at a beginning of the suspect portion and a second marker within the file at an ending of the suspect portion.

29. The device of claim 25, further comprising a decoder, wherein the one or more processors are configured to send the remaining portions of the file to the decoder.

* * * * *